US011665568B2

(12) United States Patent
Akkarakaran et al.

(10) Patent No.: US 11,665,568 B2
(45) Date of Patent: May 30, 2023

(54) BEAM REPORTING AND SCHEDULING IN MULTICARRIER BEAMFORMED COMMUNICATIONS

(71) Applicant: QUALCOMM Incorporated, San Diego, CA (US)

(72) Inventors: Sony Akkarakaran, Poway, CA (US); Tao Luo, San Diego, CA (US); Sumeeth Nagaraja, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/144,740

(22) Filed: Jan. 8, 2021

(65) Prior Publication Data

US 2021/0136613 A1    May 6, 2021

Related U.S. Application Data

(63) Continuation of application No. 15/457,873, filed on Mar. 13, 2017, now Pat. No. 10,904,784.
(Continued)

(51) Int. Cl.
*H04W 24/10* (2009.01)
*H04L 5/00* (2006.01)
(Continued)

(52) U.S. Cl.
CPC .......... *H04W 24/10* (2013.01); *H04B 7/0617* (2013.01); *H04L 5/001* (2013.01);
(Continued)

(58) Field of Classification Search
CPC ..... H04W 24/10; H04W 16/28; H04W 88/02; H04W 88/08; H04W 24/08; H04W 4/02;
(Continued)

(56) References Cited

U.S. PATENT DOCUMENTS 8,543,070 B2     9/2013 Howard et al.
8,917,660 B2 *  12/2014 Zuniga ................. H04W 72/04
                                              370/328
(Continued)

FOREIGN PATENT DOCUMENTS

CN       101102136 A     1/2008
CN       101485106 A     7/2009
(Continued)

OTHER PUBLICATIONS

Marinier et al. U.S. Appl. No. 62/344,754, filed Jun. 2, 2016 (Year: 2016).*

(Continued)

*Primary Examiner* — Wutchung Chu
(74) *Attorney, Agent, or Firm* — Holland & Hart LLP

(57) ABSTRACT

Methods, systems, and devices for wireless communication are described. A base station may partition a plurality of carriers into one or more groups. Each carrier within a group may share one or more antenna panels so as to each be directed by a transmit beam in a same direction. The base station may transmit to a user equipment a carrier group indication that identifies the partitioning of the plurality of carriers into the one or more groups and maps a group identifier for at least one of the one or more groups to a beam identifier that identifies the corresponding transmit beam.

20 Claims, 18 Drawing Sheets

Related U.S. Application Data

(60) Provisional application No. 62/350,630, filed on Jun. 15, 2016.

(51) Int. Cl.
*H04B 7/06* (2006.01)
*H04L 67/303* (2022.01)
*H04W 16/28* (2009.01)
*H04L 5/14* (2006.01)
*H04W 88/02* (2009.01)
*H04W 88/08* (2009.01)

(52) U.S. Cl.
CPC .......... *H04L 5/0023* (2013.01); *H04L 5/0051* (2013.01); *H04L 5/0092* (2013.01); *H04L 67/303* (2013.01); *H04W 16/28* (2013.01); H04L 5/14 (2013.01); H04W 88/02 (2013.01); H04W 88/08 (2013.01)

(58) Field of Classification Search
CPC ........... H04W 36/0085; H04W 72/085; H04W 72/042; H04W 36/0083; H04W 72/02; H04W 24/02; H04W 36/30; H04W 72/046; H04W 36/0058; H04W 52/365; H04B 7/0617; H04B 7/0695; H04B 7/0641; H04B 7/0888; H04B 7/0417; H04B 7/0632; H04B 17/24; H04B 7/0408; H04B 7/0626; H04B 7/088; H04B 17/318; H04B 7/06; H04B 7/063; H04B 17/309; H04B 7/0639; H04B 7/024; H04B 7/0452; H04L 5/0051; H04L 67/303; H04L 5/001; H04L 5/0048; H04L 5/0023; H04L 5/0092; H04L 5/14
See application file for complete search history.

(56) References Cited

U.S. PATENT DOCUMENTS

| | | | | |
|---|---|---|---|---|
| 9,154,211 B2* | 10/2015 | Sampath | ............. | H04B 7/0632 |
| 9,490,887 B2* | 11/2016 | Schneider | ............. | H04W 72/30 |
| 9,900,797 B2* | 2/2018 | Jung | ................... | H04B 7/0617 |
| 10,225,867 B2* | 3/2019 | Nagaraja | ........... | H04W 74/0833 |
| 10,251,071 B2* | 4/2019 | Yu | ......................... | H04W 16/28 |
| 10,356,631 B1* | 7/2019 | Pawar | .................. | H04B 7/0617 |
| 10,405,347 B2* | 9/2019 | Shi | ........................ | H04W 16/14 |
| 10,425,968 B2* | 9/2019 | Qian | ..................... | H04W 16/28 |
| 10,523,304 B2* | 12/2019 | Jung | .................... | H04L 5/0023 |
| 10,616,907 B2* | 4/2020 | Kim | ..................... | H04B 7/0617 |
| 11,350,254 B1* | 5/2022 | Natarajan | ............. | H04W 12/61 |
| 2004/0037263 A1* | 2/2004 | Zeira | ................... | H04W 72/541 370/347 |
| 2009/0225885 A1* | 9/2009 | Aoki | ....................... | H04B 7/08 375/260 |
| 2010/0113078 A1* | 5/2010 | Farajidana | ........... | H04B 7/0632 455/507 |
| 2010/0128656 A1* | 5/2010 | Kim | .................. | H04W 72/0453 370/316 |
| 2010/0265925 A1* | 10/2010 | Liu | .................... | H04W 72/0446 370/336 |
| 2011/0053628 A1* | 3/2011 | Kim | .................. | H04B 7/18539 455/509 |
| 2012/0076039 A1* | 3/2012 | Kwon | .................. | H04B 7/0634 370/252 |
| 2012/0113866 A1* | 5/2012 | Tenny | .................... | H04W 24/10 370/254 |
| 2012/0120838 A1* | 5/2012 | Farajidana | ........... | H04B 7/0632 370/252 |
| 2013/0064129 A1* | 3/2013 | Koivisto | ................ | H04B 7/065 370/252 |
| 2013/0170452 A1* | 7/2013 | Kwon | .................. | H04B 7/0617 370/329 |
| 2014/0198681 A1* | 7/2014 | Jung | ...................... | H04W 24/10 370/252 |
| 2015/0009951 A1* | 1/2015 | Josiam | ................ | H04L 25/0224 370/330 |
| 2015/0016379 A1* | 1/2015 | Nam | ...................... | H04B 7/0478 370/329 |
| 2015/0189568 A1* | 7/2015 | Stanze | ................. | H04B 7/0417 370/331 |
| 2015/0236411 A1* | 8/2015 | Garrett | ..................... | H01Q 3/24 370/338 |
| 2015/0257073 A1* | 9/2015 | Park | ...................... | H04L 5/0048 370/331 |
| 2015/0282122 A1* | 10/2015 | Kim | ..................... | H04B 17/336 370/329 |
| 2015/0304868 A1* | 10/2015 | Yu | ........................ | H04W 56/001 370/312 |
| 2016/0006122 A1* | 1/2016 | Seol | ..................... | H04B 7/0408 342/372 |
| 2016/0006529 A1* | 1/2016 | Yi | .......................... | H04L 5/0044 370/329 |
| 2016/0073393 A1* | 3/2016 | Kim | ......................... | H04W 72/51 455/509 |
| 2016/0119910 A1* | 4/2016 | Krzymien | ............ | H04B 7/0639 370/329 |
| 2016/0150435 A1* | 5/2016 | Baek | ..................... | H04B 7/0608 370/252 |
| 2016/0190707 A1* | 6/2016 | Park | ........................ | H01Q 3/24 370/329 |
| 2016/0211899 A1* | 7/2016 | Yang | ..................... | H04B 7/0617 |
| 2016/0330732 A1* | 11/2016 | Moon | .................. | H04B 7/0639 |
| 2017/0005764 A1* | 1/2017 | Park | ..................... | H04W 72/23 |
| 2017/0134913 A1* | 5/2017 | Cui | .......................... | H04B 7/06 |
| 2017/0150487 A1* | 5/2017 | Zhou | ........................ | H04B 7/04 |
| 2017/0156097 A1* | 6/2017 | Weber | ................... | H04L 5/0048 |
| 2017/0195026 A1* | 7/2017 | Ghosh | ................. | H04B 7/0617 |
| 2017/0302341 A1* | 10/2017 | Yu | .......................... | H04B 7/0695 |
| 2017/0311274 A1* | 10/2017 | Yu | ........................ | H04W 56/001 |
| 2017/0339718 A1* | 11/2017 | Liu | ......................... | H04W 74/08 |
| 2017/0366992 A1* | 12/2017 | Rune | .................... | H04B 7/0617 |
| 2017/0366994 A1 | 12/2017 | Akkarakaran et al. | | |
| 2018/0026683 A1* | 1/2018 | Manholm | ............ | H04B 7/0695 375/267 |
| 2018/0049154 A1* | 2/2018 | Choi | ...................... | H04W 48/16 |
| 2018/0109304 A1* | 4/2018 | Wiberg | ................ | H04B 7/0639 |
| 2018/0124624 A1* | 5/2018 | Chen | ..................... | H04W 24/10 |
| 2018/0310322 A1* | 10/2018 | Zhang | ................. | H04B 7/0408 |
| 2019/0075515 A1* | 3/2019 | Obara | ................... | H04B 7/0413 |
| 2019/0081688 A1* | 3/2019 | Deenoo | .................. | H04L 5/005 |
| 2019/0089420 A1* | 3/2019 | Koskela | ................ | H04B 7/0639 |
| 2019/0098525 A1* | 3/2019 | Hessler | ................... | H04W 8/02 |
| 2019/0123870 A1* | 4/2019 | Frenne | .................. | H04L 5/0023 |
| 2019/0159054 A1* | 5/2019 | Yiu | .................... | H04W 36/0085 |
| 2020/0145079 A1* | 5/2020 | Marinier | ............ | H04B 7/0695 |

FOREIGN PATENT DOCUMENTS

| | | | | |
|---|---|---|---|---|
| CN | 101635619 A | 1/2010 | | |
| CN | 101997808 A | 3/2011 | | |
| CN | 103493395 A | 1/2014 | | |
| CN | 105356921 A | 2/2016 | | |
| EP | 1483926 B1 | 9/2012 | | |
| JP | 2015164281 A | 9/2015 | | |
| JP | 2015222988 A | 12/2015 | | |
| WO | WO-2007127744 A1 | 11/2007 | | |
| WO | WO-2008103805 A2 | 8/2008 | | |
| WO | WO-2018028158 A1 * | 2/2018 | ............ | H04B 7/06 |
| WO | WO2018028158 A1 | 2/2018 | | |

OTHER PUBLICATIONS

Frenne et al., "U.S. Appl. No. 62/322,835, filed Apr. 15, 2016 (Year: 2016)".

International Search Report and Written Opinion—PCT/US2017/035606—ISA/EPO—dated Aug. 30, 2017.

Mamat K., et al., "Subcarrier clustering for MISO-OFDM channels with quantized beamforming," Electrical Engineering/Electronics,

(56) References Cited

OTHER PUBLICATIONS

Computer, Telecommunications and Information Technology (ECTI-CON), 2012, 9th International Conference on IEEE, May 16, 2012 (May 16, 2012), pp. 1-4.

* cited by examiner

BEAM REPORTING AND SCHEDULING IN MULTICARRIER BEAMFORMED COMMUNICATIONS

CROSS REFERENCES

The present Application for Patent is a continuation of U.S. patent application Ser. No. 15/457,873 by Akkarakaran, et al., entitled "Beam Reporting and Scheduling in Multicarrier Beamformed Communications," filed Mar. 13, 2017, which claims priority to U.S. Provisional Patent Application No. 62/350,630 by Akkarakaran, et al., entitled "Beam Reporting and Scheduling in Multicarrier Millimeter-Wave Communications," filed Jun. 15, 2016; each of which is assigned to the assignee hereof. U.S. patent application Ser. No. 15/457,873 is expressly incorporated by reference herein.

INTRODUCTION

The following relates generally to multicarrier beamformed wireless communication, and more specifically to beam reporting and scheduling in multicarrier beamformed communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some wireless communication systems may operate in mmW frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in beamformed communications systems, transmissions from the UE may be beamformed. In frequency bands lower than mmW frequency ranges, UEs and base stations with large number of antenna elements may use beamformed communications to increase reliability.

Some wireless communications systems may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplex (FDD) and time division duplex (TDD) component carriers.

mmW communication promises to bring gigabit speeds to cellular networks, due to availability of large amounts of bandwidth. CA may be used to further increase the available bandwidth and data-rates. CA may include operations on multiple cells or carriers. However, the unique challenges of heavy path-loss faced by beamformed communication systems may result in the use of analog beamforming, which may have or use new functionality when combined with CA.

SUMMARY

The described techniques relate to improved methods, systems, devices, or apparatuses that support beam reporting and scheduling in multicarrier beamformed communications. For example, the described techniques provide for a base station or cell to partition carriers into group(s) where carriers within a group may use the same antenna panel.

A method of multicarrier beamformed wireless communication is described. The method may include partitioning a plurality of carriers into one or more groups, each carrier within a group sharing one or more antenna panels so as to each be directed by a transmit beam in a same direction and transmitting to a UE a carrier grouping indication that identifies the partitioning of the plurality of carriers into the one or more groups and maps a group identifier for at least one of the one or more groups to a beam identifier that identifies the corresponding transmit beam.

An apparatus for multicarrier beamformed wireless communication is described. The apparatus may include means for partitioning a plurality of carriers into one or more groups, each carrier within a group sharing one or more antenna panels so as to each be directed by a transmit beam in a same direction and means for transmitting to a UE a carrier grouping indication that identifies the partitioning of the plurality of carriers into the one or more groups and maps a group identifier for at least one of the one or more groups to a beam identifier that identifies the corresponding transmit beam.

Another apparatus for multicarrier beamformed wireless communication is described. The apparatus may include a processor, memory in electronic communication with the processor, and instructions stored in the memory. The instructions may be operable to cause the processor to partition a plurality of carriers into one or more groups, each carrier within a group sharing one or more antenna panels so as to each be directed by a transmit beam in a same direction and transmit to a UE a carrier grouping indication that identifies the partitioning of the plurality of carriers into the one or more groups and maps a group identifier for at least one of the one or more groups to a beam identifier that identifies the corresponding transmit beam.

A non-transitory computer-readable medium for multicarrier beamformed wireless communication is described. The non-transitory computer-readable medium may include instructions operable to cause a processor to partition a plurality of carriers into one or more groups, each carrier within a group sharing one or more antenna panels so as to each be directed by a transmit beam in a same direction and transmit to a UE a carrier grouping indication that identifies the partitioning of the plurality of carriers into the one or more groups and maps a group identifier for at least one of the one or more groups to a beam identifier that identifies the corresponding transmit beam.

Some examples of the method, apparatus, and non-transitory computer-readable medium described above may further include processes, features, means, or instructions for receiving from the UE a carrier grouping capability indication that indicates one or more UE constraints on the partitioning of the plurality of carriers. Some examples of the method, apparatus, and non-transitory computer-readable medium described above may further include processes, features, means, or instructions for determining whether to modify the partitioning of the plurality of carriers based at least in part on the carrier grouping capability indication.

Some examples of the method, apparatus, and non-transitory computer-readable medium described above may further include processes, features, means, or instructions for transmitting to the UE a request for one or more carrier measurement reports, the request indicating whether the UE may be to provide one or more reports on a per carrier basis, one or more reports on a per group basis, or combinations thereof.

Some examples of the method, apparatus, and non-transitory computer-readable medium described above may further include processes, features, means, or instructions for indicating to the UE that the one or more carrier measurement reports for carriers of at least one group may be to be transmitted on a single respective carrier. Some examples of the method, apparatus, and non-transitory computer-readable medium described above may further include processes, features, means, or instructions for receiving from the UE one or more carrier measurement reports representing carrier measurements of each group.

In some examples of the method, apparatus, and non-transitory computer-readable medium described above, the one or more carrier measurement reports include one or more reports on a per carrier basis for carriers within each group. In some examples of the method, apparatus, and non-transitory computer-readable medium described above, the one or more carrier measurement reports include one or more reports on a per group basis for all carriers within each group.

In some examples of the method, apparatus, and non-transitory computer-readable medium described above, the one or more carrier measurement reports include periodic or aperiodic reports, and short-term or long-term average reports. Some examples of the method, apparatus, and non-transitory computer-readable medium described above may further include processes, features, means, or instructions for receiving the one or more carrier measurement reports for carriers of at least one group on a single respective carrier.

In some examples of the method, apparatus, and non-transitory computer-readable medium described above, the one or more carrier measurement reports for the carriers of the at least one group each include a carrier identity field. Some examples of the method, apparatus, and non-transitory computer-readable medium described above may further include processes, features, means, or instructions for transmitting, on a carrier of the plurality of carriers, a single scheduling grant to the UE to simultaneously schedule the UE on one or more carriers within one of the one or more groups.

Some examples of the method, apparatus, and non-transitory computer-readable medium described above may further include processes, features, means, or instructions for refraining from transmitting additional scheduling grants to the UE for the one or more carriers within the one of the one or more groups during a same transmission time interval (TTI) as that on which the single scheduling grant may be transmitted. In some examples of the method, apparatus, and non-transitory computer-readable medium described above, the partitioning of the plurality of carriers into one or more groups may be UE-specific.

Some examples of the method, apparatus, and non-transitory computer-readable medium described above may further include processes, features, means, or instructions for negotiating with a second UE to use carrier grouping with the second UE. Some examples of the method, apparatus, and non-transitory computer-readable medium described above may further include processes, features, means, or instructions for receiving, from the second UE, per carrier measurement reports in advance of negotiating with the second UE. Some examples of the method, apparatus, and non-transitory computer-readable medium described above may further include processes, features, means, or instructions for receiving, from the second UE, per group measurement reports after negotiating with the second UE.

A method of multicarrier beamformed wireless communication is described. The method may include receiving, at a UE and from a base station, a carrier grouping indication that indicates that a plurality of carriers are partitioned into one or more groups, each carrier within a group sharing one or more antenna panels so as to each be directed by a transmit beam in a same direction, the carrier grouping indication further mapping a group identifier for at least one of the one or more groups to a beam identifier that identifies the corresponding transmit beam and receiving one or more transmissions from the base station relating to UE communication on at least one of the one or more groups using one of the transmit beams corresponding to the one of the one or more groups.

An apparatus for multicarrier beamformed wireless communication is described. The apparatus may include means for receiving, at a UE and from a base station, a carrier grouping indication that indicates that a plurality of carriers are partitioned into one or more groups, each carrier within a group sharing one or more antenna panels so as to each be directed by a transmit beam in a same direction, the carrier grouping indication further mapping a group identifier for at least one of the one or more groups to a beam identifier that identifies the corresponding transmit beam and means for receiving one or more transmissions from the base station relating to UE communication on at least one of the one or more groups using one of the transmit beams corresponding to the one of the one or more groups.

Another apparatus for multicarrier beamformed wireless communication is described. The apparatus may include a processor, memory in electronic communication with the processor, and instructions stored in the memory. The instructions may be operable to cause the processor to receive, at a UE and from a base station, a carrier grouping indication that indicates that a plurality of carriers are partitioned into one or more groups, each carrier within a group sharing one or more antenna panels so as to each be directed by a transmit beam in a same direction, the carrier grouping indication further mapping a group identifier for at least one of the one or more groups to a beam identifier that identifies the corresponding transmit beam and receive one or more transmissions from the base station relating to UE communication on at least one of the one or more groups using one of the transmit beams corresponding to the one of the one or more groups.

A non-transitory computer-readable medium for multicarrier beamformed wireless communication is described. The non-transitory computer-readable medium may include instructions operable to cause a processor to receive, at a UE and from a base station, a carrier grouping indication that indicates that a plurality of carriers are partitioned into one or more groups, each carrier within a group sharing one or more antenna panels so as to each be directed by a transmit beam in a same direction, the carrier grouping indication further mapping a group identifier for at least one of the one or more groups to a beam identifier that identifies the corresponding transmit beam and receive one or more transmissions from the base station relating to UE communication on at least one of the one or more groups using one of the transmit beams corresponding to the one of the one or more groups.

Some examples of the method, apparatus, and non-transitory computer-readable medium described above may further include processes, features, means, or instructions for transmitting to the base station a carrier grouping capability indication that indicates one or more UE constraints on the partitioning of the plurality of carriers. Some examples of the method, apparatus, and non-transitory computer-readable medium described above may further include processes, features, means, or instructions for negotiating with a neighbor base station to use carrier grouping between the UE and the neighbor base station.

Some examples of the method, apparatus, and non-transitory computer-readable medium described above may further include processes, features, means, or instructions for transmitting to the neighbor base station per carrier measurement reports in advance of negotiating with the neighbor base station. Some examples of the method, apparatus, and non-transitory computer-readable medium described above may further include processes, features, means, or instructions for transmitting to the neighbor base station per group measurement reports after negotiating with the neighbor base station.

In some examples of the method, apparatus, and non-transitory computer-readable medium described above, receiving one or more transmission comprises: receiving from the base station a request for one or more carrier measurement reports, wherein the request indicates whether the UE may be to provide one or more reports on a per carrier basis, one or more reports on a per group basis, or combinations thereof. In some examples of the method, apparatus, and non-transitory computer-readable medium described above, the request for one or more carrier measurement reports further indicates that the one or more carrier measurement reports for carriers of at least one group may be to be transmitted on a single respective carrier.

Some examples of the method, apparatus, and non-transitory computer-readable medium described above may further include processes, features, means, or instructions for transmitting to the base station one or more carrier measurement reports representing carrier measurements of each group. In some examples of the method, apparatus, and non-transitory computer-readable medium described above, the one or more carrier measurement reports include one or more reports on a per carrier basis for carriers within each group.

In some examples of the method, apparatus, and non-transitory computer-readable medium described above, the one or more carrier measurement reports include one or more reports on a per group basis for all carriers within each group. In some examples of the method, apparatus, and non-transitory computer-readable medium described above, the one or more carrier measurement reports include periodic or aperiodic reports, and short-term or long-term average reports.

Some examples of the method, apparatus, and non-transitory computer-readable medium described above may further include processes, features, means, or instructions for transmitting the one or more carrier measurement reports for carriers of at least one group on a single respective carrier.

In some examples of the method, apparatus, and non-transitory computer-readable medium described above, the one or more carrier measurement reports for the carriers of the at least one group each include a carrier identity field.

In some examples of the method, apparatus, and non-transitory computer-readable medium described above, receiving one or more transmission comprises: receiving, on a carrier of the plurality of carriers, a single scheduling grant to the UE to simultaneously schedule the UE on one or more carriers within one of the one or more groups.

DETAILED DESCRIPTION

Figure 1:
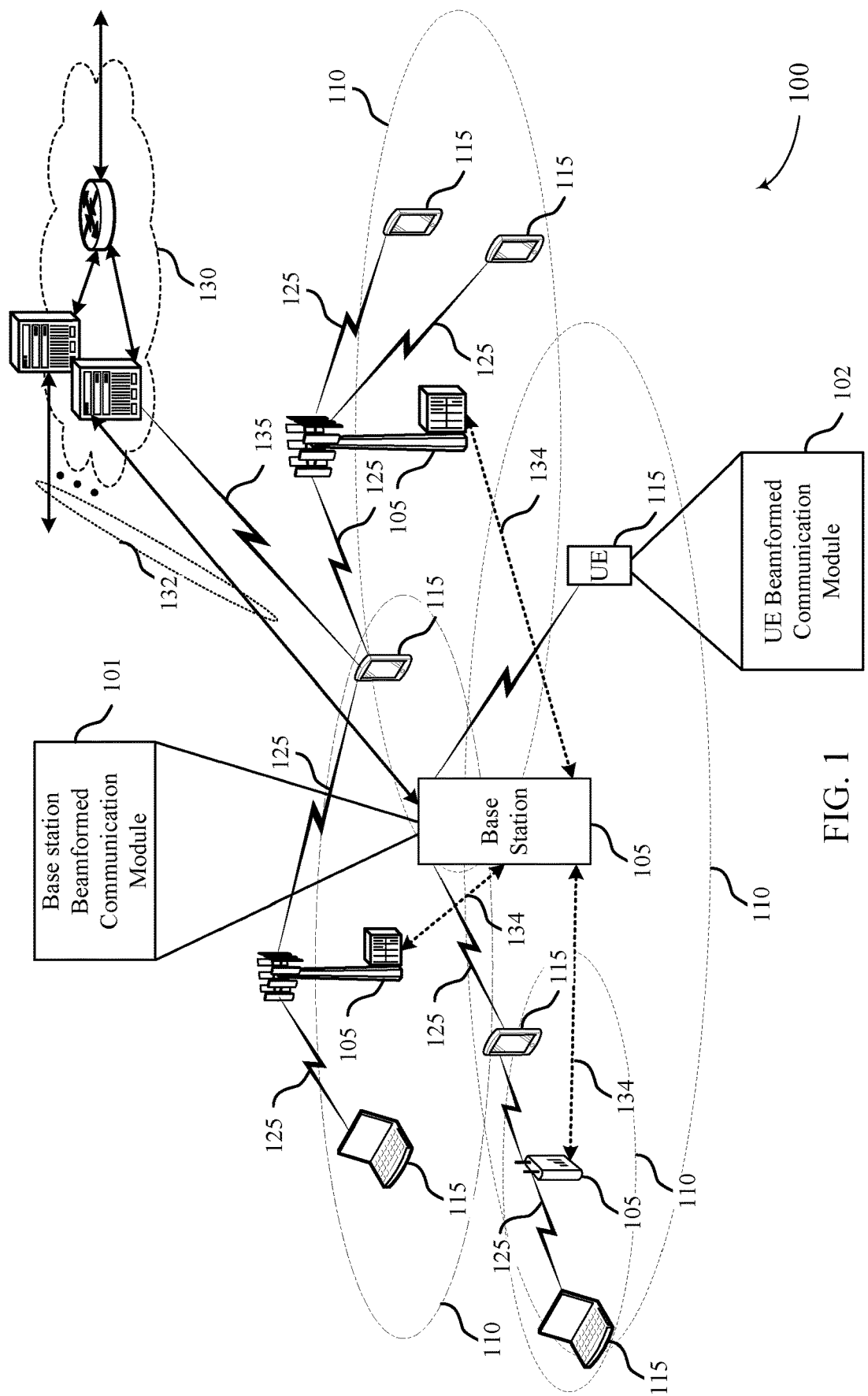
FIG. 1 illustrates an example of a system for multicarrier beamformed wireless communication that supports beam reporting and scheduling in multicarrier beamformed communications, in accordance with one or more aspects of the present disclosure.

In a multicarrier beamformed communication system, the multiple component carriers may share the same antenna panels, in which case, the beams from the carriers will point in the same direction (e.g., a single beam carries all the carriers). Alternatively, the carriers may be divided into groups, where carriers in the same group use the same panel while those in different groups use different panels. In this case, the beams from different groups may be pointed in different directions. In LTE, due to frequency selectivity across multiple carriers, the UE measurement and reporting may be done separately on each component carrier. The frequency selectivity could arise in beamformed communication systems as well. However, if the beams from all the component carriers within a group of component carriers are known to be in the same direction at the transmitter, then beam related UE measurements may be combined across multiple component carriers.

For example, with separate measurements in each carrier, due to frequency selectivity, the strongest beam received at the UE may not be the same across all carriers. However, if the eNodeB is constrained to use the same beam across all carriers, these separate strongest-beam reports may be combined across carriers in some fashion at the base station to determine which beam to use. For example, the base station may select a beam that is commonly reported for all carriers. However, if the UE reports strengths of all the different beams on each carrier, then the base station may combine the strengths across carriers for each beam, and thus determine the globally strongest beam across all the carriers. This solution, however, may require extensive reporting from the UE. To reduce uplink reporting overhead, it may be preferable to report at most a few strongest beams on each carrier.

In addition, for the UE to be able to use channel reciprocity when forming its uplink beams on each carrier, the UE may also be able to form a separate beam for each group of carriers that is sent on a common downlink beam. It is likely that the antenna panel locations at the UE may have different (and possibly more heavy) constraints than that at the base station. Thus the UE may have a different set of constraints on the number of distinct beams to which the carriers may be allocated.

Aspects of the disclosure are initially described in the context of a wireless communications system. For example, a base station may partition carriers into group(s), e.g., carrier group(s). Each carrier within the group may share antenna panel(s) to be directed by a transmit beam in the same direction, e.g., beamformed in the same direction. The base station may transmit a carrier grouping indication to a UE that identifies the partitioning of the carriers into the carrier group(s) and maps a group identifier for each carrier group to a beam identifier that identifies the corresponding transmit beam. The UE may receive the carrier grouping indication from the base station and receive transmission(s) from the base station relating to UE communications on at least one of the carrier group(s) using one of the transmit beams that corresponds to the carrier group(s).

Aspects of the disclosure are further illustrated by and described with reference to apparatus diagrams, system diagrams, and flowcharts that relate to beam reporting and scheduling in multicarrier beamformed communications.

FIG. 1 illustrates an example of a wireless communications system 100, in accordance with one or more aspects of the present disclosure. The wireless communications system 100 includes network access devices (e.g., base stations 105, gNodeBs (gNBs), and/or radio heads (RHs)), UEs 115, and a core network 130. In some examples, the wireless communications system 100 may be an LTE (or LTE-Advanced) network. In some examples, the wireless communications system 100 may be an advanced wireless communication system operating in the millimeter wave spectrum, e.g., a mmW wireless communication system.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may additionally or alternatively be referred to as a mobile station, a subscriber station, a remote unit, a wireless device, an access terminal (AT), a handset, a user agent, a client, or like terminology. A UE 115 may additionally or alternatively be a cellular phone, a wireless modem, a handheld device, a personal computer, a tablet, a personal electronic device, a machine-type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). A UE 115 may communicate with the core network 130 through communication link 135. Base stations 105 may perform radio configuration and scheduling for communication with UEs 115, or may operate under the control of a base station controller (not shown). In some examples, base stations 105 may be macro cells, small cells, hot spots, or the like. Base stations 105 may additionally or alternatively be referred to as eNodeBs (eNBs) 105. In some examples, base station 105 may additionally or alternatively be referred to as gNBs.

Wireless communications system 100 may operate in an ultra-high frequency (UHF) frequency region using frequency bands from 700 MHz to 2600 MHz (2.6 GHz), although in some cases wireless local area network (WLAN) networks may use frequencies as high as 4 GHz. This region may additionally or alternatively be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may utilize extremely high frequency (EHF) portions of the spectrum (e.g., from 30 GHz to 300 GHz). This region may be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

In some cases, base station antennas may be located within one or more antenna arrays. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, a base station 105 and a UE 115 may communicate using more than one carrier. Each aggregated carrier is referred to as a CC. Each component can have a bandwidth of, e.g., 1.4, 3, 5, 10, 15 or 20 MHz. In some cases, the number of CCs can be limited to, e.g., a maximum of five giving maximum aggregated bandwidth is 100 MHz. In FDD, the number of aggregated carriers can be different in DL and UL. The number of UL component carriers may be equal to or lower than the number of DL component carriers. The individual component carriers can additionally or alternatively be of different bandwidths. For TDD, the number of CCs as well as the bandwidths of each CC will normally be the same for DL and UL. Component carriers may be arranged in a number of ways. For example, a CA configuration may be based on contiguous component carriers within the same operating frequency band, i.e., called intra-band contiguous CA. Non-contiguous allocations can also be used, where the component carriers may be either be intra-band, or inter-band.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may additionally or alternatively be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may comprise of one or multiple symbols. In some cases, the TTI duration (that is, the number of symbols in a TTI) may be variable.

Wireless communications system 100 may be or include a multicarrier beamformed wireless communication system. Broadly, aspects of wireless communications system 100 may include a UE 115 and a base station 105 informing each other about which CCs are constrained to share the same transmit beam. For example, a base station 105 may include a base station beamformed communication module 101 that may partition carriers into group(s), e.g., carrier group(s). Each carrier within the group may share antenna panel(s) to be directed by a transmit beam in the same direction, e.g., beamformed in the same direction. The base station beamformed communication module 101 may transmit a carrier grouping indication to a UE 115 that identifies the partitioning of the carriers into the carrier group(s) and maps a group identifier for each carrier group to a beam identifier that identifies the corresponding transmit beam. The UE 115 may include a UE beamformed communication module 102 that may receive the carrier grouping indication from the base station 105 and receive transmission(s) from the base station 105 relating to UE communications on at least one of the carrier group(s) using one of the transmit beams that corresponds to the carrier group(s).

Figure 2:
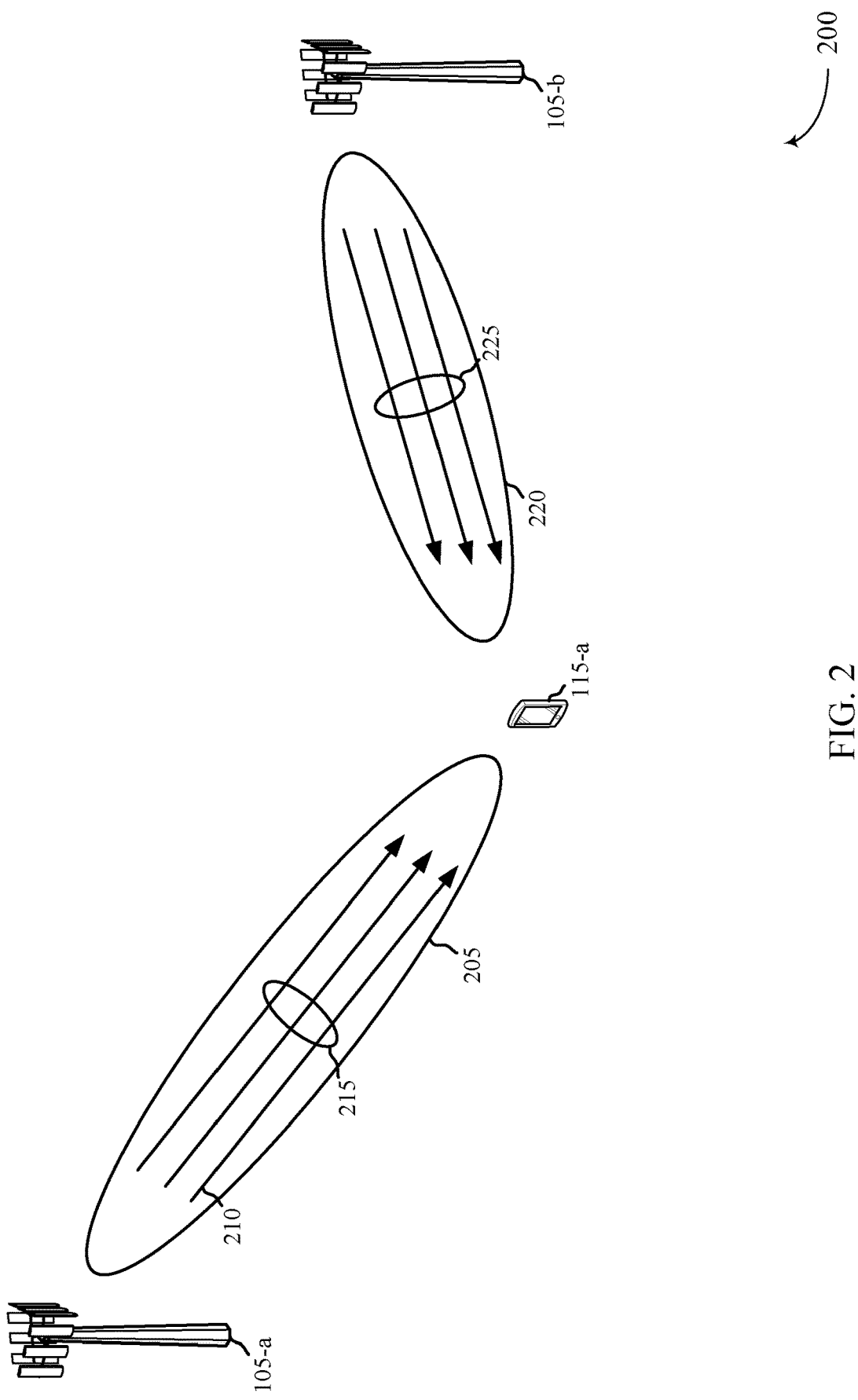
FIG. 2 illustrates an example of a system for multicarrier beamformed wireless communication that supports beam reporting and scheduling in multicarrier beamformed communications, in accordance with one or more aspects of the present disclosure.

FIG. 2 illustrates an example of a wireless communications system 200 for beam reporting and scheduling in multicarrier beamformed communications, in accordance with one or more aspects of the present disclosure. Wireless communications system 200 may be an example of aspects of wireless communications system 100 of FIG. 1. Wireless communications system 200 may include a UE 115-a, a base station 105-a, and/or a base station 105-b, which may be examples of the corresponding devices of FIG. 1.

Base station 105-a may be a serving base station for UE 115-a (additionally or alternatively referred to as a primary cell or PCell). Base station 105-b may be a neighbor base station for UE 115-a (additionally or alternatively referred to as a secondary cell or SCell). Base station 105-a and/or base station 105-b may be mmW base stations that transmit beamformed signals using one or more antenna panels. The transmissions from base station 105-a and/or base station 105-b may be beamformed transmissions that are directional towards UE 115-a. Base station 105-a and/or base station 105-b may additionally or alternatively support multicarrier communications using one or more component carriers in a beamformed wireless communication system.

For example, base station 105-a may transmit a beamformed transmission 205 to UE 115-a. Beamformed transmission 205 may include a plurality of carriers 210 that are partitioned into one or more carrier groups 215. Similarly, base station 105-b may transmit a beamformed transmission 220 to UE 115-a that includes a carrier group 225 having a plurality of carriers. It is to be understood that the wireless communications system 200 may have more than one carrier group 215 and/or carrier group 225. It is also to be understood that each carrier group may include more or less than three carriers 210.

In some aspects, base station 105-a may indicate to UE 115-a the partitioning of carriers into groups wherein all carriers within a group may use the same transmit beam, e.g., may be transmitted in the same direction. For example, this could be indicated in a radio resource configuration (RRC) message that configures the UE 115-a to receive additional carriers, after the UE 115-a receives RRC connected message on the primary carrier.

In some aspects, UE 115-a may report to the network (e.g., to or via base station 105-a) the UE 115-a's constraints (e.g., a carrier grouping capability indication) on how the carriers may be grouped into distinct uplink beams. Based on these UE 115-a reports, the network may choose to reconfigure the carrier groups. For example if the base station 105-a is capable of supporting two carrier groups, but the UE 115-a can support one carrier group (e.g., all uplink carriers have to be on the same beam), then the base station 105-a may be configured such that both its carrier groups use the same beam, thus combining them into a single carrier group, to better allow use of channel reciprocity across all carriers.

In some aspects, UE 115-a may send two types of beam measurement reports, e.g., a "per-carrier" measurement report and a "per-carrier-group" report. The carrier measurements for the per-carrier-group measurement report may be performed by treating the beam reference signals of all carriers within the group as though they came from a single carrier. For example, the frequency window over which coherent combining is performed may be widened to span multiple carriers in this group. In some aspects, the carrier measurement report in this context may refer to both periodic and aperiodic reports, and both short-term and long-term average reports.

Base station 105-a may signal in the carrier measurement request as to whether a per-carrier or per-carrier-group carrier measurement report is requested. Alternatively, if the measurement is triggered by a UE 115-a event, the UE 115-a may determine the carrier measurement report type based on various criteria such as uplink quality (e.g., use more compact per-carrier-group reporting if uplink is heavily loaded).

In an example where measurements for multiple downlink carriers are reported on a single uplink carrier, the carrier measurement report may require a field denoting the carrier identity. For reporting a measurement on a downlink carrier group, any one of the corresponding uplink carriers may suffice. If reporting multiple downlink carrier group measurements on a single uplink carrier, a field for carrier-group identity may be used in the uplink report.

The neighbor cell, e.g., base station 105-b, measurements may be initially reported separately per carrier. Subsequently, base station 105-b and UE 115-a may negotiate the carrier groups on the base station 105-b, using the described techniques above, and then generate per-carrier-group measurement reports on the base station 105-b as well.

In some configurations, the described techniques may not use per-carrier-group reports and, instead, rely on per-carrier reports and scheduling. Carrier-group reports enable finding the best common beam to use for all carriers within the group. In some configurations, the UE 115-a reports the best beam for each carrier in the group separately; this may be different for different carriers. The transmit antenna panel constraint may prevent the base station 105-a and/or base station 105-b from using different beams on different carriers in the same TTI, hence the base station 105-a and/or base station 105-b may schedule the UE 115-a on different carriers in different TTIs. This may include a larger scheduling overhead, e.g., due to the lack of time-coordination of the scheduling across carriers, each carrier may use its own downlink control information (DCI) scheduling grant. Using carrier-groups on the other hand, a new scheduling grant may be designed to schedule the UE 115-a simultaneously (in the same TTI) on all carriers in the carrier-group. This may reduce the scheduling overhead. Further constraints may be introduced to additionally or alternatively reduce the overhead of decoding the scheduling grants at the UE 115-a. For example, a grant scheduling a UE over a whole carrier group may be transmitted in a carrier within that group; and if present, the other carriers in the group refrain from carrying scheduling grants to that UE, thus making it unnecessary for that UE to look for scheduling grants in those other carriers. This applies for both uplink grants and downlink grants. In some aspects, uplink scheduling grants that apply across a carrier group may use a different definition of the carrier groups compared to downlink, to reflect the different antenna panel constraints on uplink as compared to downlink.

Thus, the described techniques may support beam reporting and scheduling in a multicarrier beamformed wireless communications system, such as system 200. For example, base station 105-a may partition a plurality of carriers into group(s). Each carrier within a group may share antenna panel(s) so as to be directed by a transmit beam in a same direction. The base station 105-a may transmit to UE 115-a a carrier grouping indication that identifies the partitioning of the plurality of carriers into the group(s) and maps a group identifier for at least one of the group(s) to a beam identifier that identifies the corresponding transmit beam. The base station 105-a may receive from UE 115-a a carrier grouping capability indication that indicates UE constraint(s) on the partitioning of the plurality of carriers. The base station 105-a may determine whether to modify the partitioning of the plurality of carriers based at least in part on the carrier grouping capability indication.

The base station 105-a may transmit to the UE 115-a a request for carrier measurement report(s). The request may indicate whether the UE 115-a is to provide one or more reports on a per carrier basis (e.g., a per-carrier report), one or more reports on a per group basis (e.g., a per-carrier-group report), or combinations thereof. The base station 105-a may indicate to the UE 115-a that the carrier measurement report(s) for carriers of at least one group are to be transmitted on a single respective carrier. The base station 105-a may receive from the UE 115-a carrier measurement report(s) representing carrier measurements of each group. The carrier measurement report(s) may include one or more reports on a per carrier basis for carriers within each group. The carrier measurement report(s) may include one or more reports on a per group basis for all carriers within each group. The carrier measurement report(s) may include periodic or aperiodic reports, and short-term or long-term average reports. The base station 105-a may receive the carrier measurement report(s) for carriers of at least one group on a single respective carrier. The carrier measurement report(s) for the carriers of the at least one group may each include a carrier identity field.

The base station 105-a may transmit, on a carrier of the plurality of carriers, a single scheduling grant to the UE 115-a to simultaneously schedule the UE 115-a on one or more carriers within one of the one or more groups. The base station 105-a may refrain from transmitting additional scheduling grants for the carrier(s) within the one of the one or more groups during the same TTI as that on which the single scheduling grant is transmitted. In some aspects, partitioning of the plurality of carriers into one or more groups is UE-specific.

Figure 3:
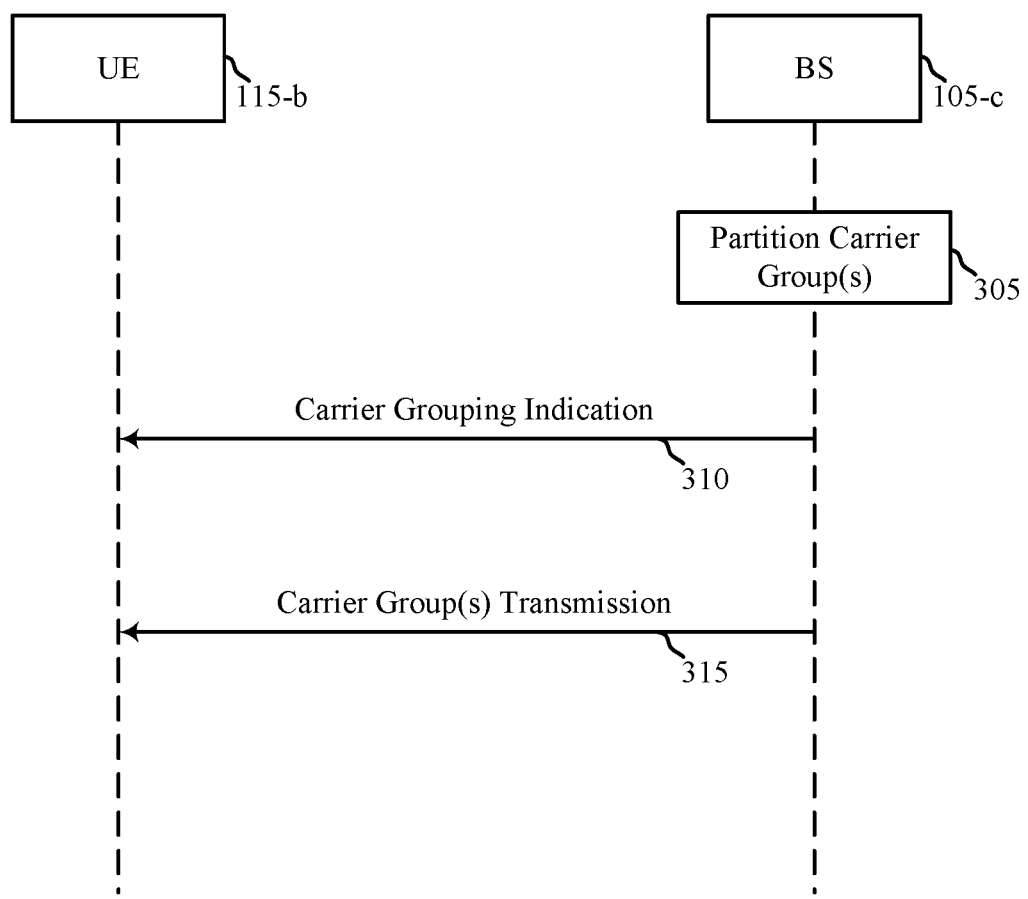
FIG. 3 illustrates an example of a process flow diagram that supports beam reporting and scheduling in multicarrier beamformed communications, in accordance with one or more aspects of the present disclosure.

The base station 105-b may negotiate with the UE 115-a to use carrier grouping. The base station 105-b may receive, from the UE 115-a, per carrier measurement reports in advance of negotiating with the UE 115-a, and receive, from the UE 115-a, per group measurement reports after negotiating with the UE 115-a FIG. 3 illustrates an example of a process flow 300 for beam reporting and scheduling in multicarrier beamformed communications, in accordance with one or more aspects of the present disclosure. Process flow 300 may implement aspects of wireless communications system 100 of FIG. 1 and/or wireless communications system 200 of FIG. 2. Process flow 300 may include a UE 115-b and a base station 105-c, which may be examples of the corresponding devices of FIG. 1 and/or FIG. 2.

At 305, base station 105-c may partition a plurality of carriers into one or more groups. Each carrier within a group may share antenna panel(s) so as to each be directed by a transmit beam in the same direction. In some examples, partitioning the plurality of carriers may be UE-specific, e.g., particular to UE 115-b.

At 310, base station 105-c may transmit to UE 115-b a carrier group indication that identifies the partitioning of the plurality of carriers into the group(s). The carrier group indication may map a group identifier for at least one group to a beam identifier that identifies the corresponding transmit beam.

In some aspects, the base station 105-c may receive additional constraint information from the UE 115-b such that the base station 105-c may modify the grouping and send an updated message to the UE 115-b. In this way, the grouping may be based on both the base station 105-c and the UE 115-b.

At 315, the base station 105-c may transmit (and UE 115-b may receive) transmissions relating to UE 115-b communications on at least one of the group(s) using one of the transmit beams corresponding to the at least one group.

In some aspects, the base station 105-c may request measurement reports from the UE 115-b on a per-carrier basis and/or on a per-carrier-group (or per-group) basis. The base station 105-*c* may indicate to the UE 115-*b* which carrier, how many carriers, etc., the measurement reports are to be provided. The per-carrier-group measurement reports may include a measurement associated with all of the carriers in the group and/or may include a measurement associated with one or more individual carriers in the group. The measurement reports may be periodic and/or aperiodic and may additionally or alternatively be short-term and/or long-term reports.

In some aspects, the base station 105-*c* may negotiate with a second UE (not shown) using the described techniques. For example, the base station 105-*c* may negotiate with the second UE to establish carrier grouping for communications with the second UE. The base station 105-*c* may receive per-carrier measurement reports from the second UE before the negotiation and receiver per-carrier group measurement reports from the second UE after the negotiations. Similarly, the UE 115-*b* may negotiate with a neighbor base station (not shown) using the described techniques. For example, the UE 115-*b* may negotiate with the neighbor base station to establish carrier grouping for communications between the UE 115-*b* and the neighbor base station. The UE 115-*b* may transmit per-carrier measurement reports to the neighbor base station before the negotiation and transmit per-carrier group measurement reports to the neighbor base station after the negotiations.

Figure 4:
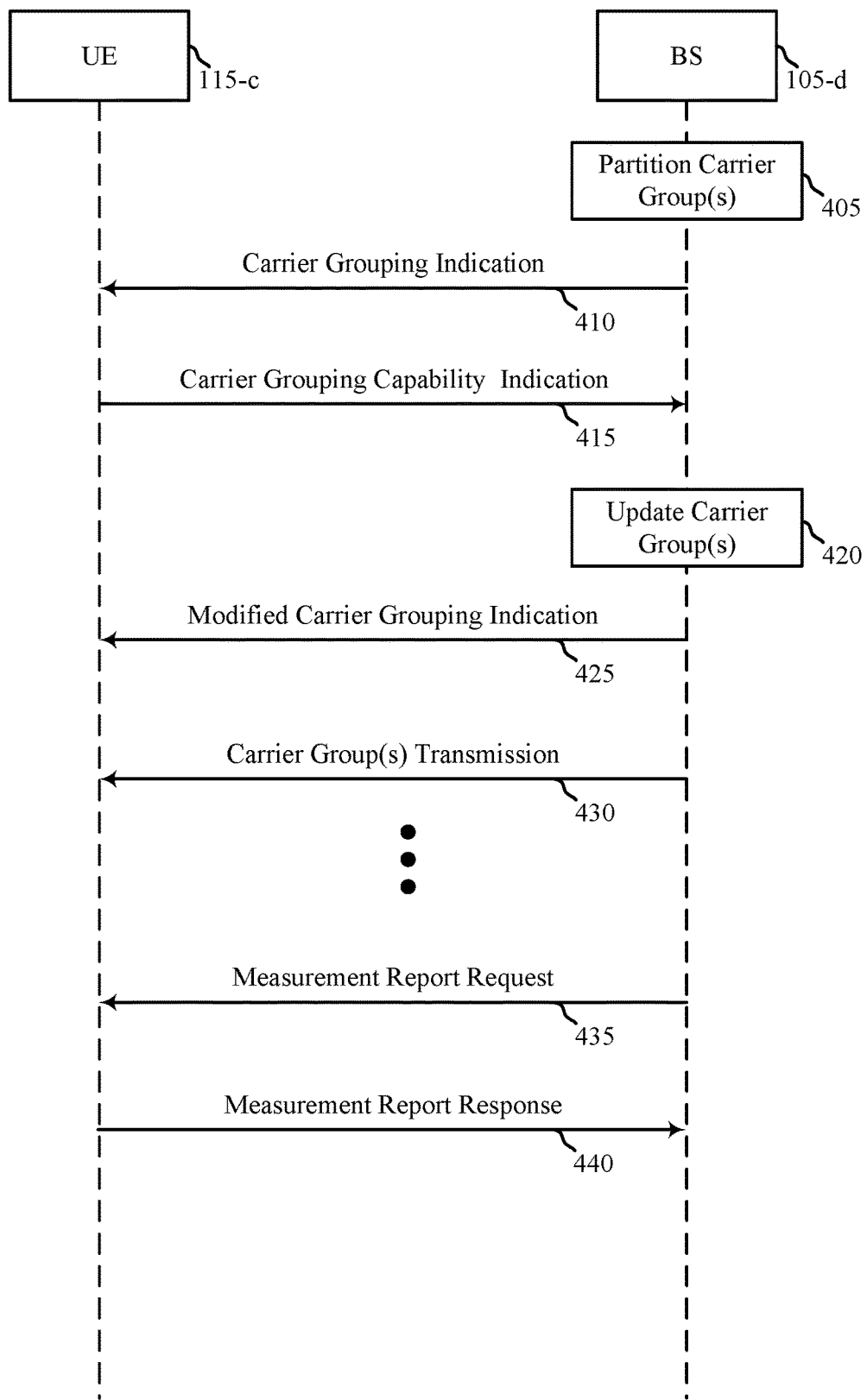
FIG. 4 illustrates an example of a process flow diagram that supports beam reporting and scheduling in multicarrier beamformed communications, in accordance with one or more aspects of the present disclosure.

FIG. 4 illustrates an example of a process flow 400 for beam reporting and scheduling in multicarrier beamformed communications, in accordance with one or more aspects of the present disclosure. Process flow 400 may implement aspects of wireless communications system 100 of FIG. 1 and/or wireless communications system 200 of FIG. 2. Process flow 400 may include a UE 115-*c* and a base station 105-*d*, which may be examples of the corresponding devices of FIGS. 1 through 3.

At 405, base station 105-*d* may partition a plurality of carriers into one or more groups. Each carrier within a group may share antenna panel(s) so as to each be directed by a transmit beam in the same direction. In some examples, partitioning the plurality of carriers may be UE-specific, e.g., particular to UE 115-*c*.

At 410, base station 105-*d* may transmit to UE 115-*c* a carrier group indication that identifies the partitioning of the plurality of carriers into the group(s). The carrier group indication may map a group identifier for at least one group to a beam identifier that identifies the corresponding transmit beam.

At 415, UE 115-*c* may transmit to base station 105-*d* a carrier grouping capability indication that indicates one or more UE 115-*c* constraints on partitioning the plurality of carriers. At 420, the base station 105-*d* may determine whether to modify (and update when necessary) the partitioning of the plurality of carriers based on the carrier grouping capability indication. At 425, the base station 105-*d* may transmit a modified carrier grouping indication to the UE 115-*c*.

At 430, the base station 105-*d* may transmit transmission(s) relating to UE 115-*c* communications on at least one of the group(s) using one of the transmit beams corresponding to the at least one group. The UE 115-*c* may receive, on a carrier of the plurality of carriers in the carrier group, a single scheduling grant to simultaneously schedule the UE 115-*c* on one or more carriers within one of the one or more carrier groups.

At 435, the base station 105-*d* may transmit to the UE 115-*c* a request for one or more carrier measurement reports. The request may indicate whether the UE 115-*c* is to provide one or more reports on a per-carrier basis and/or on a per-carrier-group basis. At 440, the base station 105-*d* may receive from UE 115-*c* the one or more carrier measurement reports representing carrier measurements, e.g., carrier measurements of each group. The carrier measurement report may be transmitted on a single respective carrier, in some examples. The carrier measurement report may include a carrier identity field.

Figure 5:
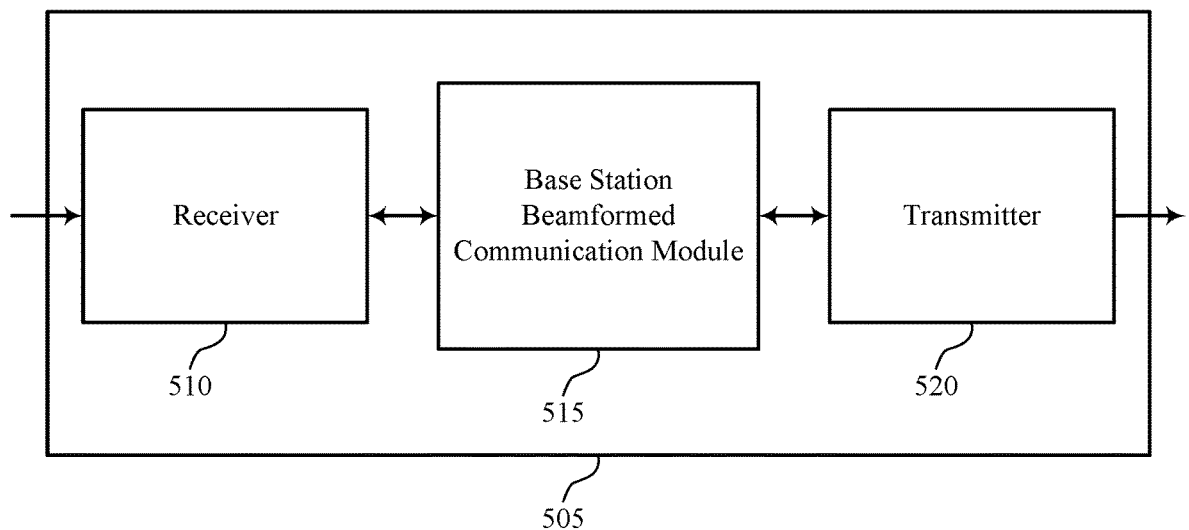
FIGS. 5 through 7 show block diagrams of a device that supports beam reporting and scheduling in multicarrier beamformed communications, in accordance with one or more aspects of the present disclosure.

FIG. 5 shows a block diagram 500 of a wireless device 505 that supports beam reporting and scheduling in multicarrier beamformed communications, in accordance with one or more aspects of the present disclosure. Wireless device 505 may be an example of aspects of a base station 105 as described with reference to FIGS. 1 through 4. Wireless device 505 may include receiver 510, base station beamformed communication module 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to beam reporting and scheduling in multicarrier beamformed communications, etc.). Information may be passed on to other components of the device. The receiver 510 may be an example of aspects of the transceiver 835 described with reference to FIG. 8.

Base station beamformed communication module 515 may be an example of aspects of the base station beamformed communication module 815 described with reference to FIG. 8. Base station beamformed communication module 515 may partition a set of carriers into one or more groups, each carrier within a group sharing one or more antenna panels so as to each be directed by a transmit beam in a same direction and transmit to a UE a carrier grouping indication that identifies the partitioning of the set of carriers into the one or more groups and maps a group identifier for at least one of the one or more groups to a beam identifier that identifies the corresponding transmit beam.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas, including a set of antenna panels for beamformed transmission.

Figure 6:
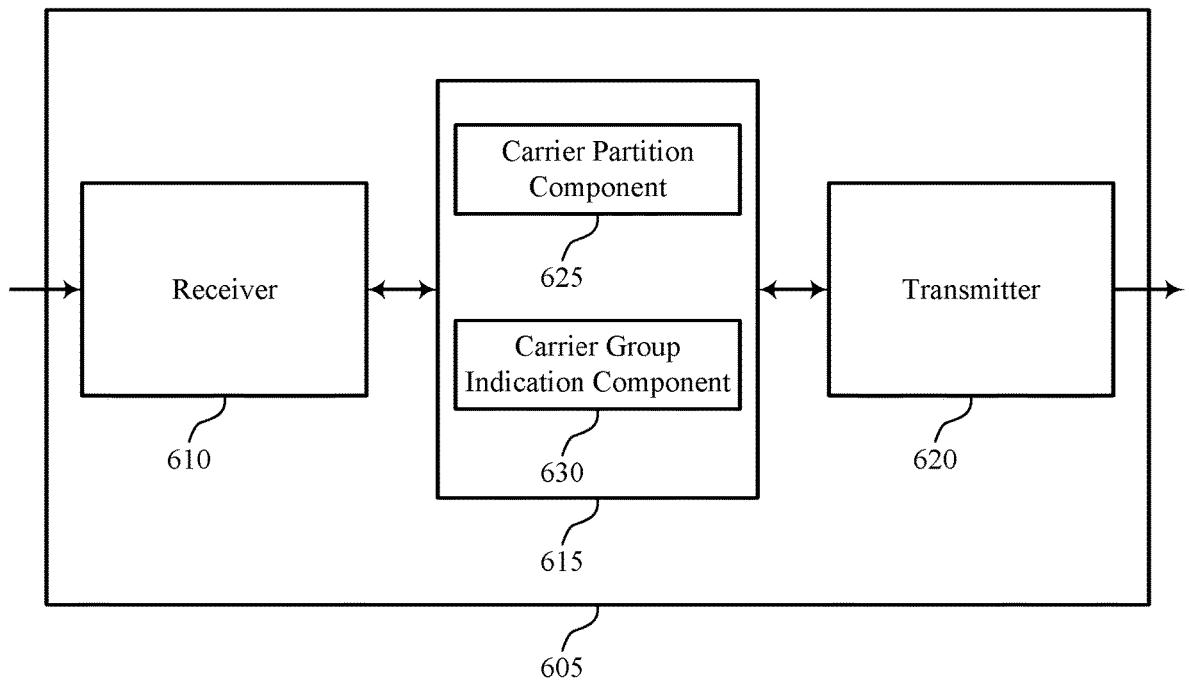

FIG. 6 shows a block diagram 600 of a wireless device 605 that supports beam reporting and scheduling in multicarrier beamformed communications, in accordance with one or more aspects of the present disclosure. Wireless device 605 may be an example of aspects of a wireless device 505 or a base station 105 as described with reference to FIGS. 1 through 5. Wireless device 605 may include receiver 610, base station beamformed communication module 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to beam reporting and scheduling in multicarrier beamformed communications, etc.). Information may be passed on to other components of the device.

The receiver 610 may be an example of aspects of the transceiver 835 described with reference to FIG. 8.

Base station beamformed communication module 615 may be an example of aspects of the base station beamformed communication module 815 described with reference to FIG. 8. Base station beamformed communication module 615 may additionally or alternatively include carrier partition component 625 and carrier group indication component 630.

Carrier partition component 625 may partition a set of carriers into one or more groups, each carrier within a group sharing one or more antenna panels so as to each be directed by a transmit beam in a same direction. In some cases, the partitioning of the set of carriers into one or more groups is UE-specific.

Carrier group indication component 630 may transmit to a UE a carrier grouping indication that identifies the partitioning of the set of carriers into the one or more groups and maps a group identifier for at least one of the one or more groups to a beam identifier that identifies the corresponding transmit beam.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas, including a set of antenna panels for beamformed transmission.

Figure 7:
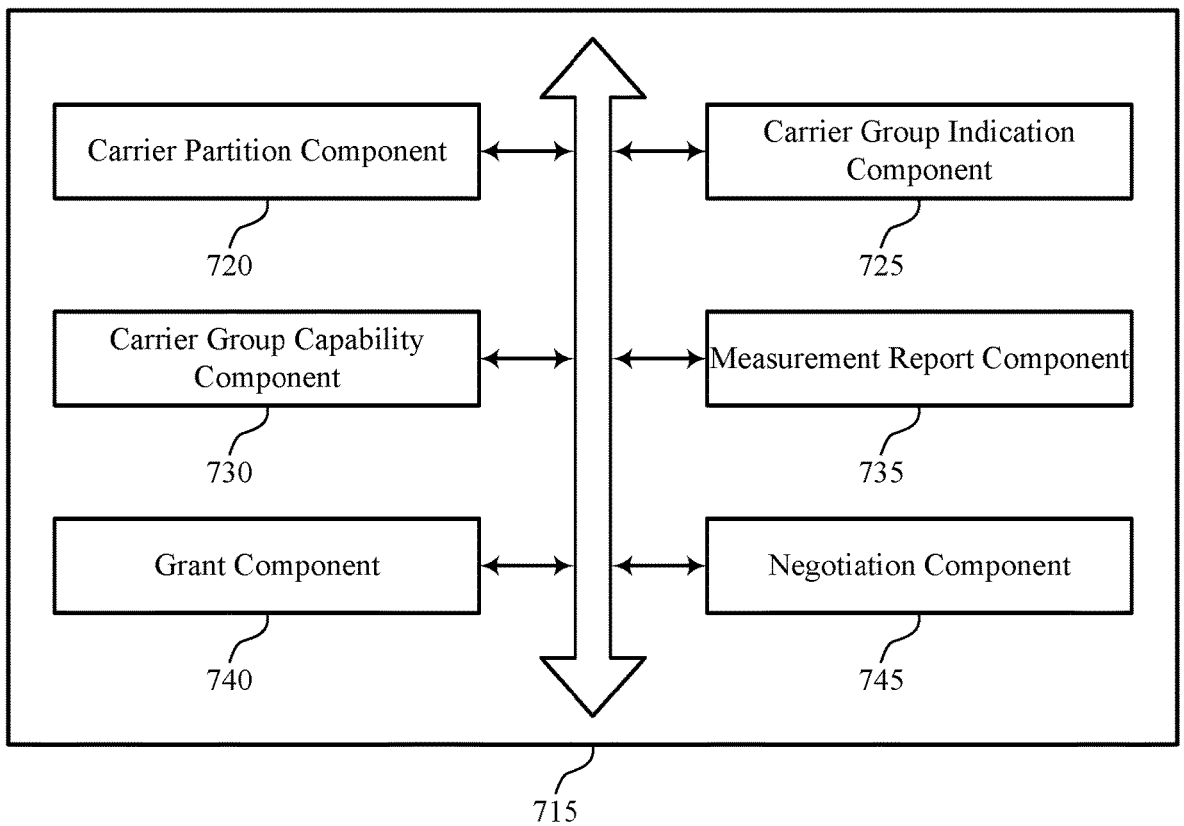

FIG. 7 shows a block diagram 700 of a base station beamformed communication module 715 that supports beam reporting and scheduling in multicarrier beamformed communications, in accordance with one or more aspects of the present disclosure. The base station beamformed communication module 715 may be an example of aspects of a base station beamformed communication module 515, a base station beamformed communication module 615, or a base station beamformed communication module 815 described with reference to FIGS. 5, 6, and 8. The base station beamformed communication module 715 may include carrier partition component 720, carrier group indication component 725, carrier group capability component 730, measurement report component 735, grant component 740, and negotiation component 745. Each of these modules may communicate, directly or indirectly, with one another (e.g., via one or more buses).

Carrier partition component 720 may partition a set of carriers into one or more groups, each carrier within a group sharing one or more antenna panels so as to each be directed by a transmit beam in a same direction. Carrier group indication component 725 may transmit to a UE a carrier grouping indication that identifies the partitioning of the set of carriers into the one or more groups and maps a group identifier for at least one of the one or more groups to a beam identifier that identifies the corresponding transmit beam.

Carrier group capability component 730 may receive from the UE a carrier grouping capability indication that indicates one or more UE constraints on the partitioning of the set of carriers and determine whether to modify the partitioning of the set of carriers based on the carrier grouping capability indication.

Measurement report component 735 may transmit to a UE a request for one or more carrier measurement reports, the request indicating whether the UE is to provide one or more reports on a per carrier basis, one or more reports on a per group basis, or combinations thereof, indicate to the UE that the one or more carrier measurement reports for carriers of at least one group are to be transmitted on a single respective carrier, receive from the UE one or more carrier measurement reports representing carrier measurements of each group, receive the one or more carrier measurement reports for carriers of at least one group on a single respective carrier, receive, from the second UE, per carrier measurement reports in advance of negotiating with the second UE, and receive, from the second UE, per group measurement reports after negotiating with the second UE.

In some cases, the one or more carrier measurement reports include one or more reports on a per carrier basis for carriers within each group. In some cases, the one or more carrier measurement reports include one or more reports on a per group basis for all carriers within each group. In some cases, the one or more carrier measurement reports include periodic or aperiodic reports, and short-term or long-term average reports. In some cases, the one or more carrier measurement reports for the carriers of the at least one group each include a carrier identity field.

Grant component 740 may transmit, on a carrier of the set of carriers, a single scheduling grant to the UE to simultaneously schedule the UE on one or more carriers within one of the one or more groups and refrain from transmitting additional scheduling grants for the one or more carriers within the one of the one or more groups during a same TTI as that on which the single scheduling grant is transmitted.

Negotiation component 745 may negotiate with a second UE to use carrier grouping with the second UE.

Figure 8:
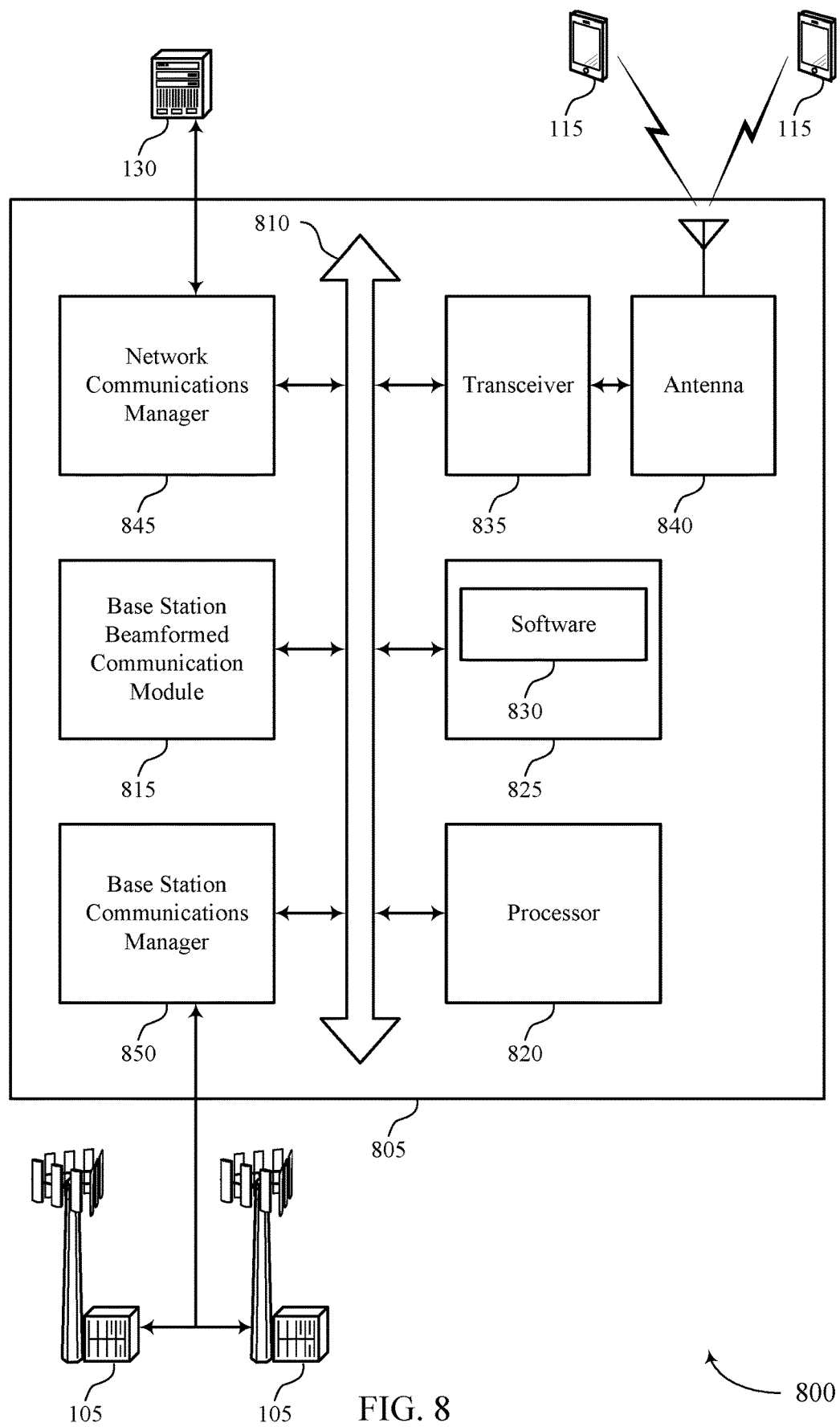
FIG. 8 illustrates a block diagram of a system including a base station that supports beam reporting and scheduling in multicarrier beamformed communications, in accordance with one or more aspects of the present disclosure.

FIG. 8 shows a diagram of a system 800 including a device 805 that supports beam reporting and scheduling in multicarrier beamformed communications, in accordance with one or more aspects of the present disclosure. Device 805 may be an example of or include the components of wireless device 505, wireless device 605, or a base station 105 as described above, e.g., with reference to FIGS. 1 through 6. Device 805 may include components for bi-directional voice and data communications including components for transmitting and receiving communications, including base station beamformed communication module 815, processor 820, memory 825, software 830, transceiver 835, antenna 840, network communications manager 845, and base station communications manager 850.

Processor 820 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting beam reporting and scheduling in multicarrier beamformed communications).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a Basic Input-Output system (BIOS) which may control basic hardware and/or software operation such as the interaction with peripheral components or devices.

Software 830 may include code to implement aspects of the present disclosure, including code to support beam reporting and scheduling in multicarrier beamformed communications. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may additionally or alternatively include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions. In some cases the device may have one or more antenna panels that may be used for beamformed transmission.

Network communications manager 845 may manage communications with the core network (e.g., via one or more wired backhaul links). For example, the network communications manager 845 may manage the transfer of data communications for client devices, such as one or more UEs 115.

Base station communications manager 850 may manage communications with other base station 105, and may include a controller or scheduler for controlling communications with UEs 115 in cooperation with other base stations 105. For example, the base station communications manager 850 may coordinate scheduling for transmissions to UEs 115 for various interference mitigation techniques such as beamforming or joint transmission. In some examples, base station communications manager 850 may provide an X2 interface within an LTE/LTE-A wireless communication network technology to provide communication between base stations 105.

Figure 9:
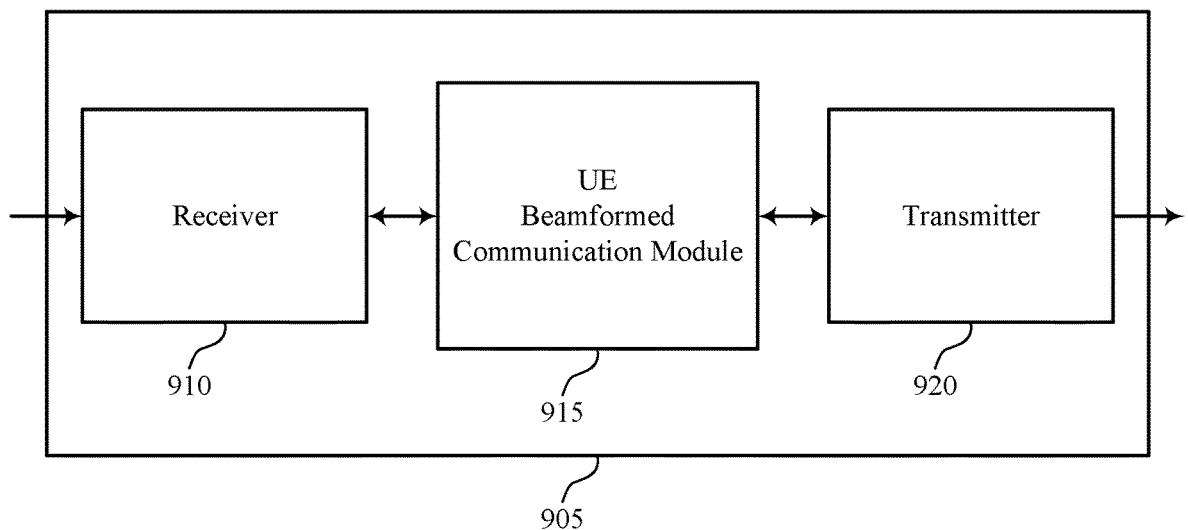
FIGS. 9 through 11 show block diagrams of a device that supports beam reporting and scheduling in multicarrier beamformed communications, in accordance with one or more aspects of the present disclosure.

FIG. 9 shows a block diagram 900 of a wireless device 905 that supports beam reporting and scheduling in multicarrier beamformed communications, in accordance with one or more aspects of the present disclosure. Wireless device 905 may be an example of aspects of a UE 115 as described with reference to FIG. 1 through 4. Wireless device 905 may include receiver 910, UE beamformed communication module 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to beam reporting and scheduling in multicarrier beamformed communications, etc.). Information may be passed on to other components of the device. The receiver 910 may be an example of aspects of the transceiver 1235 described with reference to FIG. 12.

UE beamformed communication module 915 may be an example of aspects of the UE beamformed communication module 1215 described with reference to FIG. 12. UE beamformed communication module 915 may receive, at a UE and from a base station, a carrier grouping indication that indicates that a set of carriers are partitioned into one or more groups, each carrier within a group sharing one or more antenna panels so as to each be directed by a transmit beam in a same direction, the carrier grouping indication further mapping a group identifier for at least one of the one or more groups to a beam identifier that identifies the corresponding transmit beam and receive one or more transmissions from the base station relating to UE communication on at least one of the one or more groups using one of the transmit beams corresponding to the one of the one or more groups.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas or antenna panels.

Figure 10:
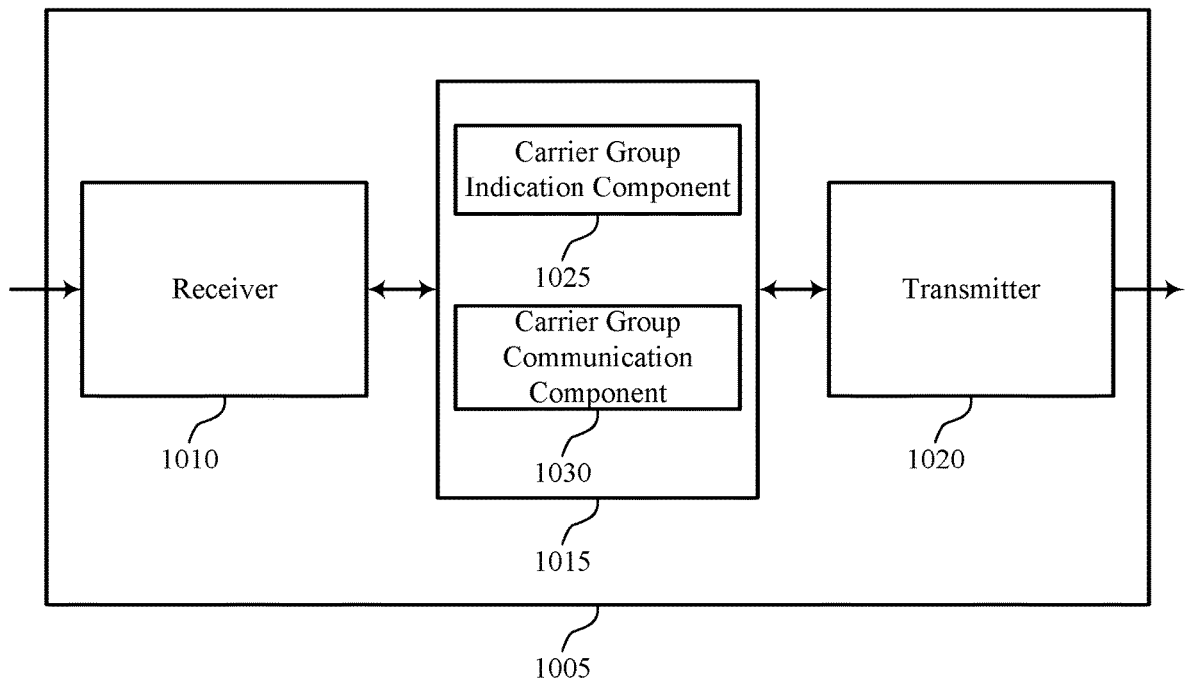

FIG. 10 shows a block diagram 1000 of a wireless device 1005 that supports beam reporting and scheduling in multicarrier beamformed communications, in accordance with one or more aspects of the present disclosure. Wireless device 1005 may be an example of aspects of a wireless device 905 or a UE 115 as described with reference to FIGS. 1 through 4 and 9. Wireless device 1005 may include receiver 1010, UE beamformed communication module 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to beam reporting and scheduling in multicarrier beamformed communications, etc.). Information may be passed on to other components of the device. The receiver 1010 may be an example of aspects of the transceiver 1235 described with reference to FIG. 12.

UE beamformed communication module 1015 may be an example of aspects of the UE beamformed communication module 1215 described with reference to FIG. 12. UE beamformed communication module 1015 may additionally or alternatively include carrier group indication component 1025 and carrier group communication component 1030.

Carrier group indication component 1025 may receive, at a UE and from a base station, a carrier grouping indication that indicates that a set of carriers are partitioned into one or more groups, each carrier within a group sharing one or more antenna panels so as to each be directed by a transmit beam in a same direction, the carrier grouping indication further mapping a group identifier for at least one of the one or more groups to a beam identifier that identifies the corresponding transmit beam.

Carrier group communication component 1030 may receive one or more transmissions from the base station relating to UE communication on at least one of the one or more groups using one of the transmit beams corresponding to the one of the one or more groups.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas or antenna panels.

Figure 11:
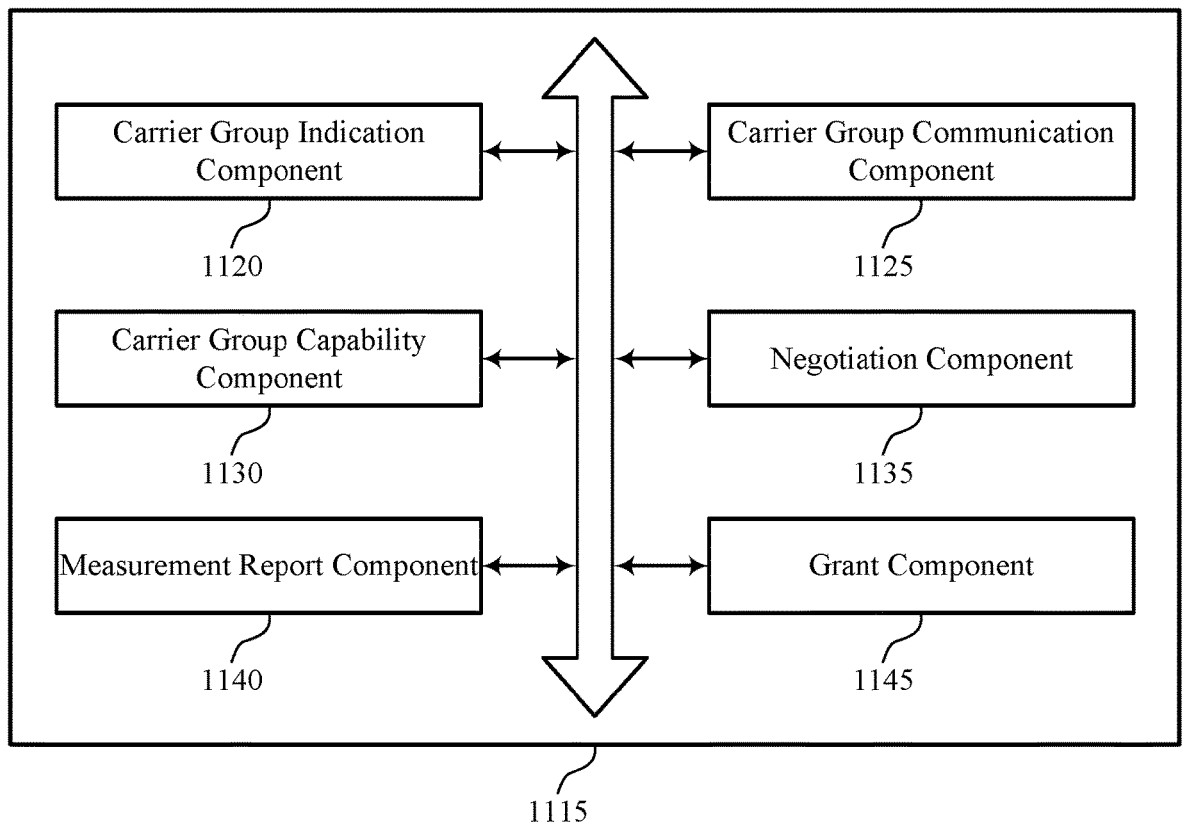

FIG. 11 shows a block diagram 1100 of a UE beamformed communication module 1115 that supports beam reporting and scheduling in multicarrier beamformed communications, in accordance with one or more aspects of the present disclosure. The UE beamformed communication module 1115 may be an example of aspects of a UE beamformed communication module 1215 described with reference to FIGS. 9, 10, and 12. The UE beamformed communication module 1115 may include carrier group indication component 1120, carrier group communication component 1125, carrier group capability component 1130, negotiation component 1135, measurement report component 1140, and grant component 1145. Each of these modules may communicate, directly or indirectly, with one another (e.g., via one or more buses).

Carrier group indication component 1120 may receive, at a UE and from a base station, a carrier grouping indication that indicates that a set of carriers are partitioned into one or more groups, each carrier within a group sharing one or more antenna panels so as to each be directed by a transmit beam in a same direction, the carrier grouping indication further mapping a group identifier for at least one of the one or more groups to a beam identifier that identifies the corresponding transmit beam.

Carrier group communication component 1125 may receive one or more transmissions from the base station relating to UE communication on at least one of the one or more groups using one of the transmit beams corresponding to the one of the one or more groups. Carrier group capability component 1130 may transmit to the base station a carrier grouping capability indication that indicates one or more UE constraints on the partitioning of the set of carriers.

Negotiation component 1135 may negotiate with a neighbor base station to use carrier grouping between the UE and the neighbor base station.

Measurement report component 1140 may transmit to the neighbor base station per carrier measurement reports in advance of negotiating with the neighbor base station, transmit to the neighbor base station per group measurement reports after negotiating with the neighbor base station, transmit to the base station one or more carrier measurement reports representing carrier measurements of each group, and transmit the one or more carrier measurement reports for carriers of at least one group on a single respective carrier.

In some cases, receiving one or more transmission includes: receiving from the base station a request for one or more carrier measurement reports, where the request indicates whether the UE is to provide one or more reports on a per carrier basis, one or more reports on a per group basis, or combinations thereof.

In some cases, the request for one or more carrier measurement reports may additionally or alternatively indicate that the one or more carrier measurement reports for carriers of at least one group are to be transmitted on a single respective carrier. In some cases, the one or more carrier measurement reports include one or more reports on a per carrier basis for carriers within each group. In some cases, the one or more carrier measurement reports include one or more reports on a per group basis for all carriers within each group. In some cases, the one or more carrier measurement reports include periodic or aperiodic reports, and short-term or long-term average reports. In some cases, the one or more carrier measurement reports for the carriers of the at least one group each include a carrier identity field.

Grant component 1145 may receive, on a carrier of the set of carriers, a single scheduling grant to the UE to simultaneously schedule the UE on one or more carriers within one of the one or more groups.

Figure 12:
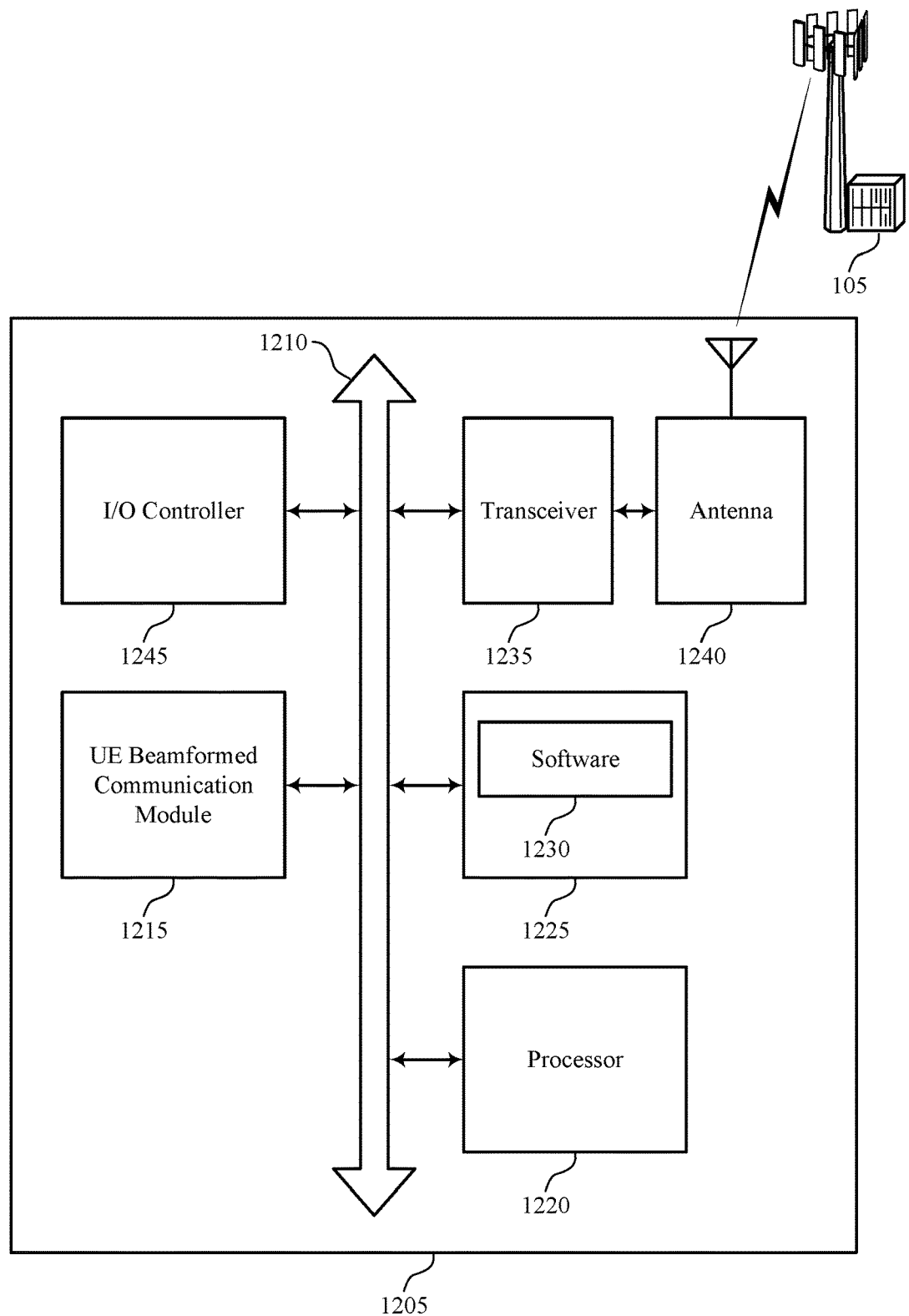
FIG. 12 illustrates a block diagram of a system including a UE that supports beam reporting and scheduling in multicarrier beamformed communications, in accordance with one or more aspects of the present disclosure.

FIG. 12 shows a diagram of a system 1200 including a device 1205 that supports beam reporting and scheduling in multicarrier beamformed communications, in accordance with one or more aspects of the present disclosure. Device 1205 may be an example of or include the components of UE 115 as described above, e.g., with reference to FIGS. 1 through 4. Device 1205 may include components for bi-directional voice and data communications including components for transmitting and receiving communications, including UE beamformed communication module 1215, processor 1220, memory 1225, software 1230, transceiver 1235, antenna 1240, and I/O controller 1245.

Processor 1220 may include an intelligent hardware device, (e.g., a general-purpose processor, a DSP, a CPU, a microcontroller, an ASIC, a FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting beam reporting and scheduling in multicarrier beamformed communications).1220.

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support beam reporting and scheduling in multicarrier beamformed communications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions. In some cases the device may have one or more antenna panels that may be used for beamformed transmission.

I/O controller 1245 may manage input and output signals for device 1205. Input/output control component 1245 may additionally or alternatively manage peripherals not integrated into device 1205. In some cases, input/output control component 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system.

Figure 13:
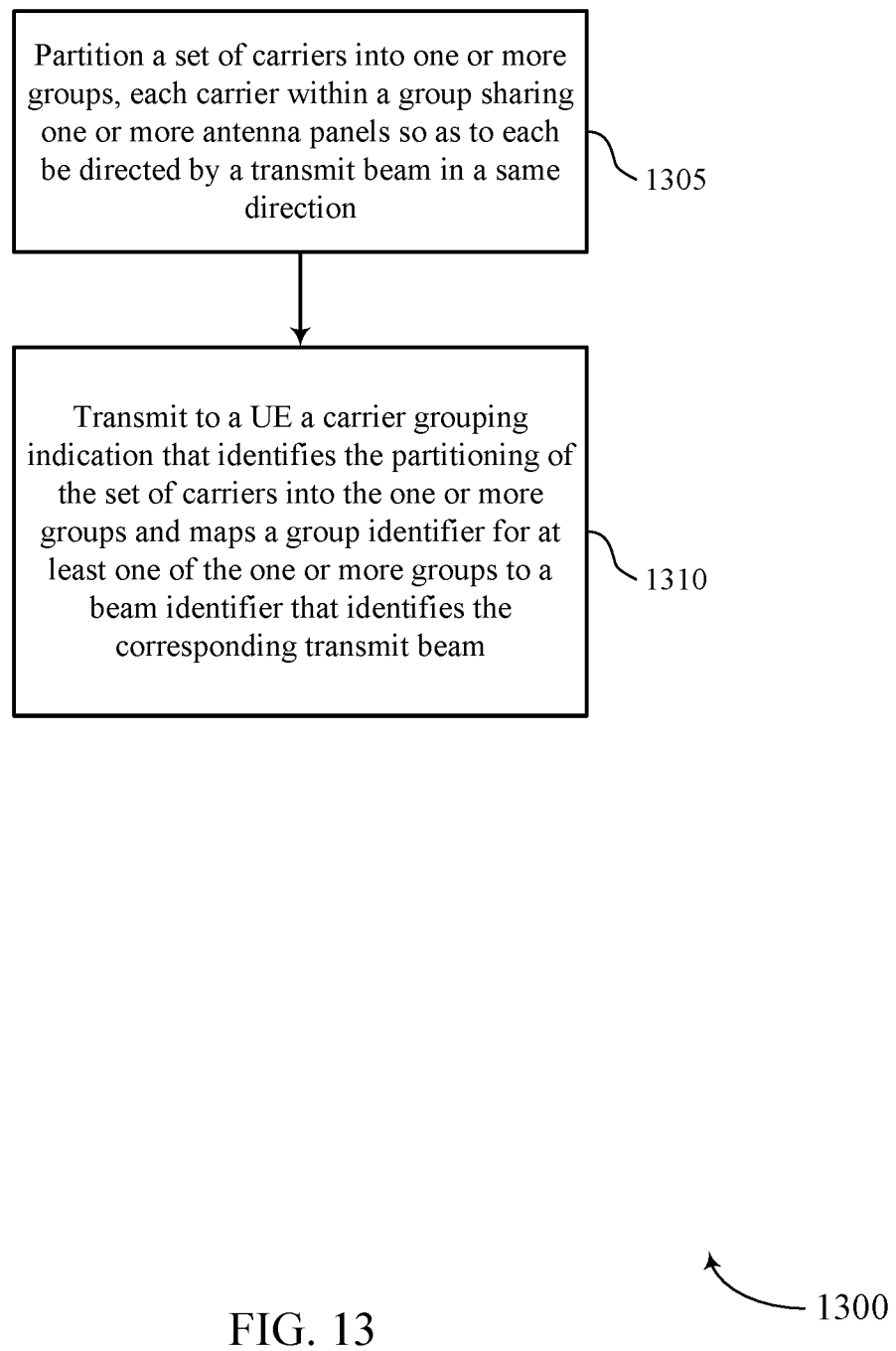
FIGS. 13 through 18 illustrate methods for beam reporting and scheduling in multicarrier beamformed communications, in accordance with one or more aspects of the present disclosure.

FIG. 13 shows a flowchart illustrating a method 1300 for beam reporting and scheduling in multicarrier beamformed communications, in accordance with one or more aspects of the present disclosure. The operations of method 1300 may be implemented by a base station 105 or its components as described herein. For example, the operations of method 1300 may be performed by a base station beamformed communication module as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 partition a set of carriers into one or more groups, each carrier within a group sharing one or more antenna panels so as to each be directed by a transmit beam in a same direction. The operations of block 1305 may be performed according to the methods described with reference to FIGS. 1 through 4. In some examples, aspects of the operations of block 1305 may be performed by a carrier partition component as described with reference to FIGS. 5 through 8.

At block 1310 the base station 105 may transmit to a UE a carrier grouping indication that identifies the partitioning of the set of carriers into the one or more groups and maps a group identifier for at least one of the one or more groups to a beam identifier that identifies the corresponding transmit beam. The operations of block 1310 may be performed according to the methods described with reference to FIGS. 1 through 4. In some examples, aspects of the operations of block 1310 may be performed by a carrier group indication component as described with reference to FIGS. 5 through 8.

Figure 14:
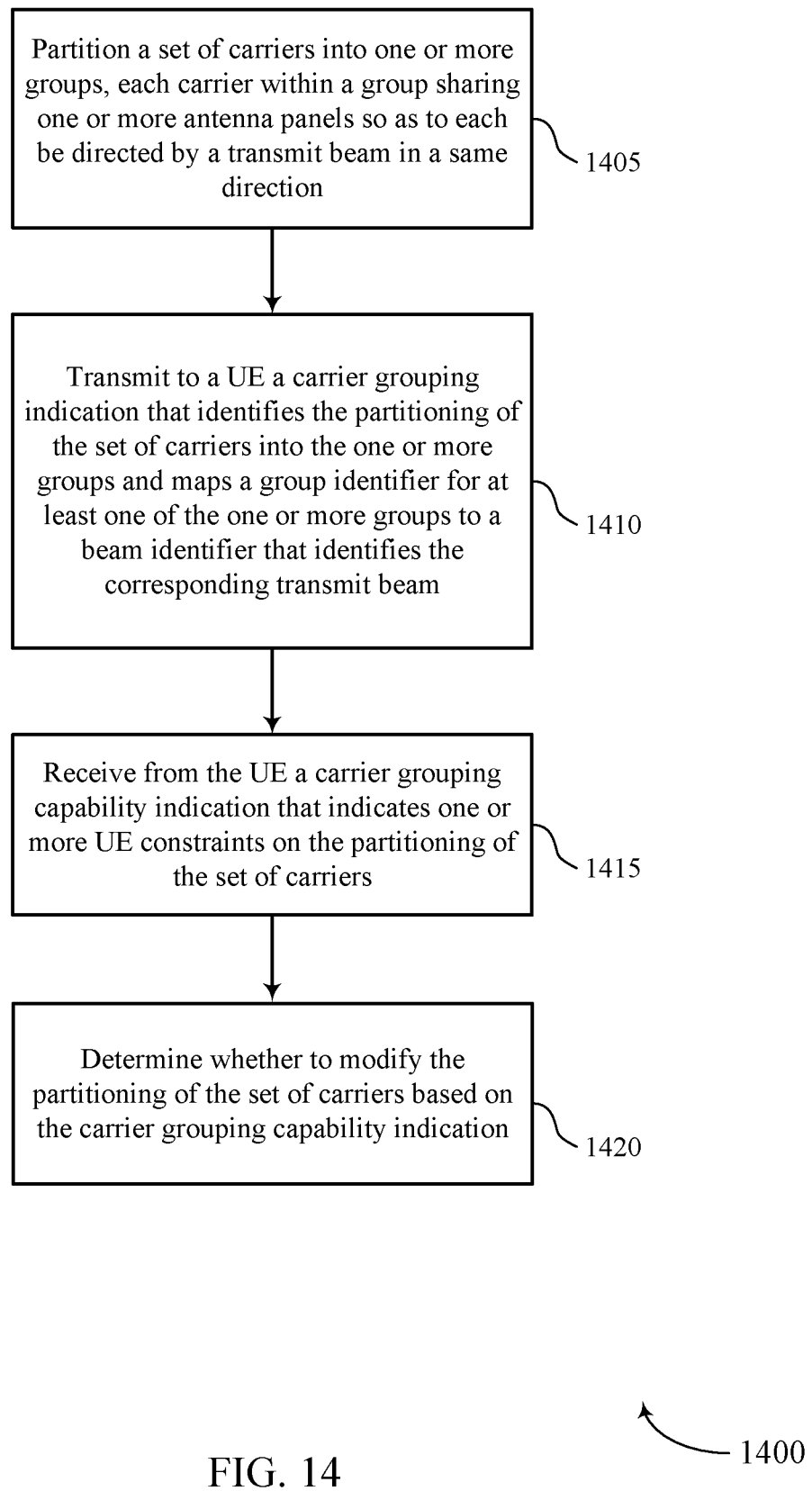

FIG. 14 shows a flowchart illustrating a method 1400 for beam reporting and scheduling in multicarrier beamformed communications, in accordance with one or more aspects of the present disclosure. The operations of method 1400 may be implemented by a base station 105 or its components as described herein. For example, the operations of method 1400 may be performed by a base station beamformed communication module as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may partition a set of carriers into one or more groups, each carrier within a group sharing one or more antenna panels so as to each be directed by a transmit beam in a same direction. The operations of block 1405 may be performed according to the methods described with reference to FIGS. 1 through 4. In some examples, aspects of the operations of block 1405 may be performed by a carrier partition component as described with reference to FIGS. 5 through 8.

At block 1410 the base station 105 may transmit to a UE a carrier grouping indication that identifies the partitioning of the set of carriers into the one or more groups and maps a group identifier for at least one of the one or more groups to a beam identifier that identifies the corresponding transmit beam. The operations of block 1410 may be performed according to the methods described with reference to FIGS. 1 through 4. In some examples, aspects of the operations of block 1410 may be performed by a carrier group indication component as described with reference to FIGS. 5 through 8.

At block 1415 the base station 105 may receive from the UE a carrier grouping capability indication that indicates one or more UE constraints on the partitioning of the set of carriers. The operations of block 1415 may be performed according to the methods described with reference to FIGS. 1 through 4. In some examples, aspects of the operations of block 1415 may be performed by a carrier group capability component as described with reference to FIGS. 5 through 8.

At block 1420 the base station 105 may determine whether to modify the partitioning of the set of carriers based on the carrier grouping capability indication. The operations of block 1420 may be performed according to the methods described with reference to FIGS. 1 through 4. In some examples, aspects of the operations of block 1420 may be performed by a carrier group capability component as described with reference to FIGS. 5 through 8.

Figure 15:
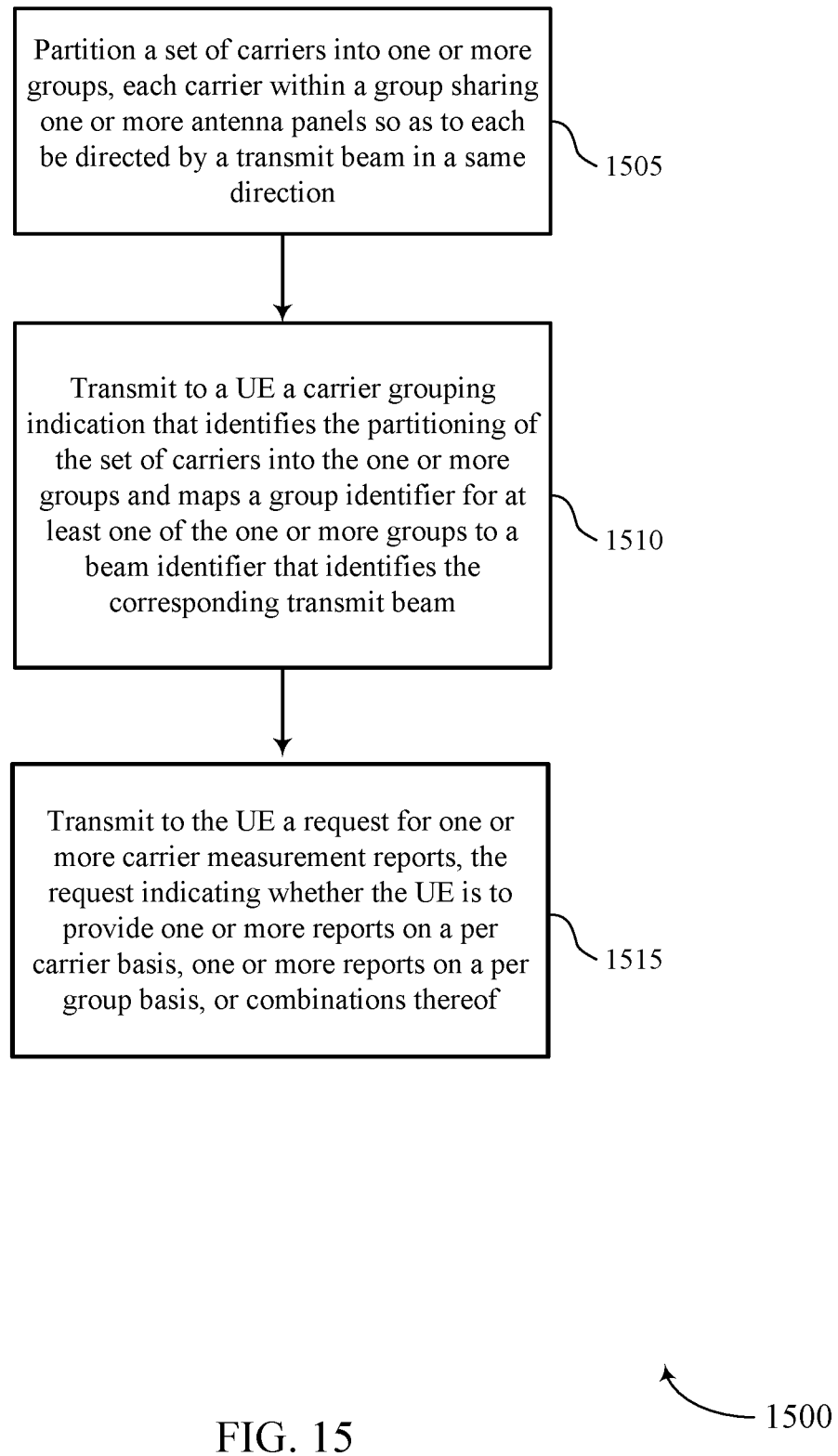

FIG. 15 shows a flowchart illustrating a method 1500 for beam reporting and scheduling in multicarrier beamformed communications, in accordance with one or more aspects of the present disclosure. The operations of method 1500 may be implemented by a base station 105 or its components as described herein. For example, the operations of method 1500 may be performed by a base station beamformed communication module as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may partition a set of carriers into one or more groups, each carrier within a group sharing one or more antenna panels so as to each be directed by a transmit beam in a same direction. The operations of block 1505 may be performed according to the methods described with reference to FIGS. 1 through 4. In some examples, aspects of the operations of block 1505 may be performed by a carrier partition component as described with reference to FIGS. 5 through 8.

At block 1510 the base station 105 may transmit to the UE a carrier grouping indication that identifies the partitioning of the set of carriers into the one or more groups and maps a group identifier for at least one of the one or more groups to a beam identifier that identifies the corresponding transmit beam. The operations of block 1510 may be performed according to the methods described with reference to FIGS. 1 through 4. In some examples, aspects of the operations of block 1510 may be performed by a carrier group indication component as described with reference to FIGS. 5 through 8.

At block 1515 the base station 105 may transmit to the UE a request for one or more carrier measurement reports, the request indicating whether the UE is to provide one or more reports on a per carrier basis, one or more reports on a per group basis, or combinations thereof. The operations of block 1515 may be performed according to the methods described with reference to FIGS. 1 through 4. In some examples, aspects of the operations of block 1515 may be performed by a measurement report component as described with reference to FIGS. 5 through 8.

Figure 16:
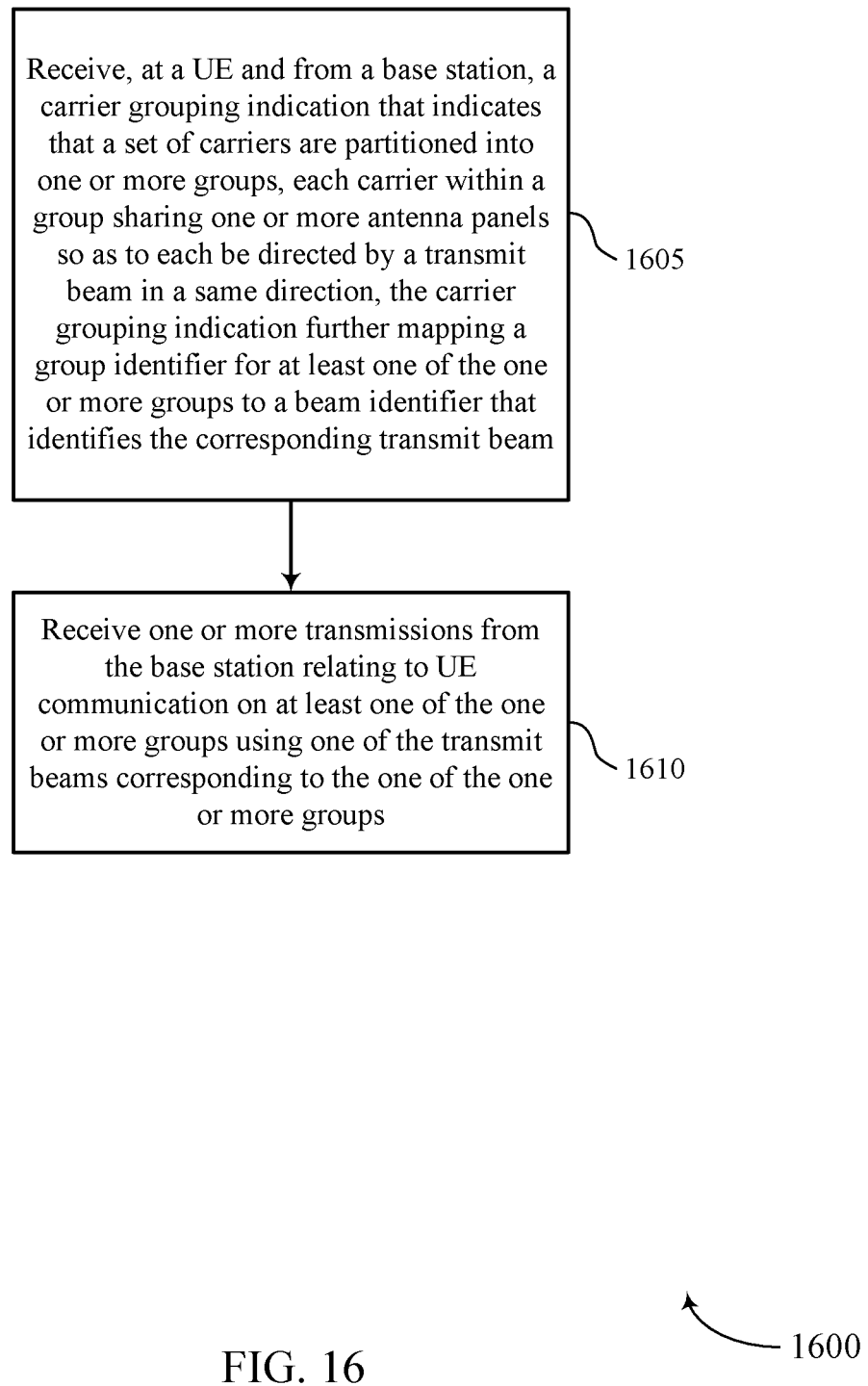

FIG. 16 shows a flowchart illustrating a method 1600 for beam reporting and scheduling in multicarrier beamformed communications, in accordance with one or more aspects of the present disclosure. The operations of method 1600 may be implemented by a UE 115 or its components as described herein. For example, the operations of method 1600 may be performed by a UE beamformed communication module as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive from a base station a carrier group indication that indicates that a set of carriers are partitioned into one or more groups, each carrier within a group sharing one or more antenna panels so as to each be directed by a transmit beam in a same direction, the carrier grouping indication further mapping a group identifier for at least one of the one or more groups to a beam identifier that identifies the corresponding transmit beam. The operations of block 1605 may be performed according to the methods described with reference to FIGS. 1 through 4. In some examples, aspects of the operations of block 1605 may be performed by a carrier group indication component as described with reference to FIGS. 9 through 12.

At block 1610 the UE 115 may receive one or more transmissions from the base station relating to UE communication on at least one of the one or more groups using one of the transmit beams corresponding to the one of the one or more groups. The operations of block 1610 may be performed according to the methods described with reference to FIGS. 1 through 4. In some examples, aspects of the operations of block 1610 may be performed by a carrier group communication component as described with reference to FIGS. 9 through 12.

Figure 17:
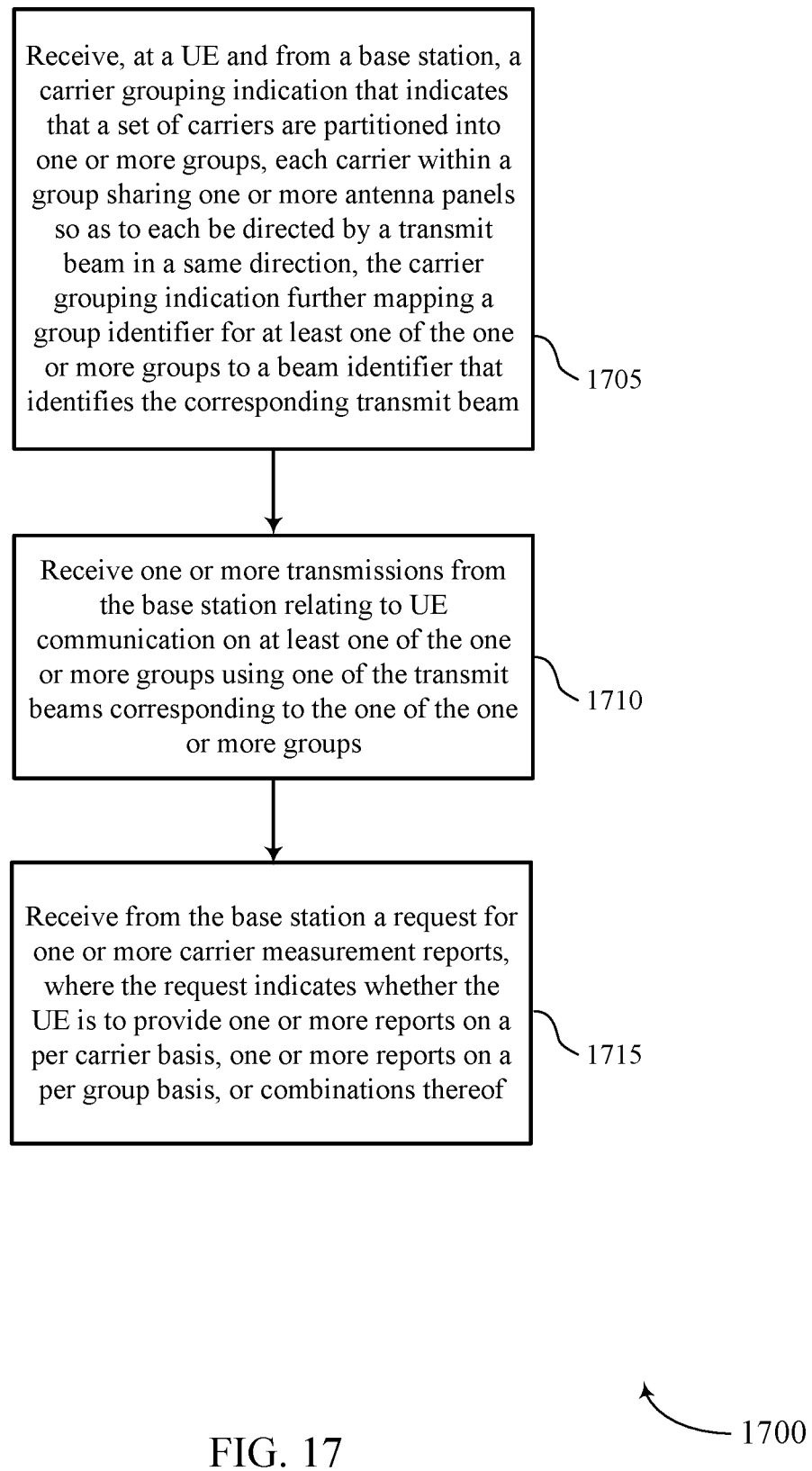

FIG. 17 shows a flowchart illustrating a method 1700 for beam reporting and scheduling in multicarrier beamformed communications, in accordance with one or more aspects of the present disclosure. The operations of method 1700 may be implemented by a UE 115 or its components as described herein. For example, the operations of method 1700 may be performed by a UE beamformed communication module as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive, from a base station, a carrier grouping indication that indicates that a set of carriers are partitioned into one or more groups, each carrier within a group sharing one or more antenna panels so as to each be directed by a transmit beam in a same direction, the carrier grouping indication further mapping a group identifier for at least one of the one or more groups to a beam identifier that identifies the corresponding transmit beam. The operations of block 1705 may be performed according to the methods described with reference to FIGS. 1 through 4. In some examples, aspects of the operations of block 1705 may be performed by a carrier group indication component as described with reference to FIGS. 9 through 12.

At block 1710 the UE 115 may receive one or more transmissions from the base station relating to UE communication on at least one of the one or more groups using one of the transmit beams corresponding to the one of the one or more groups. The operations of block 1710 may be performed according to the methods described with reference to FIGS. 1 through 4. In some examples, aspects of the operations of block 1710 may be performed by a carrier group communication component as described with reference to FIGS. 9 through 12.

At block 1715 the UE 115 may receive from the base station a request for one or more carrier measurement reports, where the request indicates whether the UE is to provide one or more reports on a per carrier basis, one or more reports on a per group basis, or combinations thereof. The operations of block 1715 may be performed according to the methods described with reference to FIGS. 1 through 4. In some examples, aspects of the operations of block 1715 may be performed by a measurement report component as described with reference to FIGS. 9 through 12.

Figure 18:
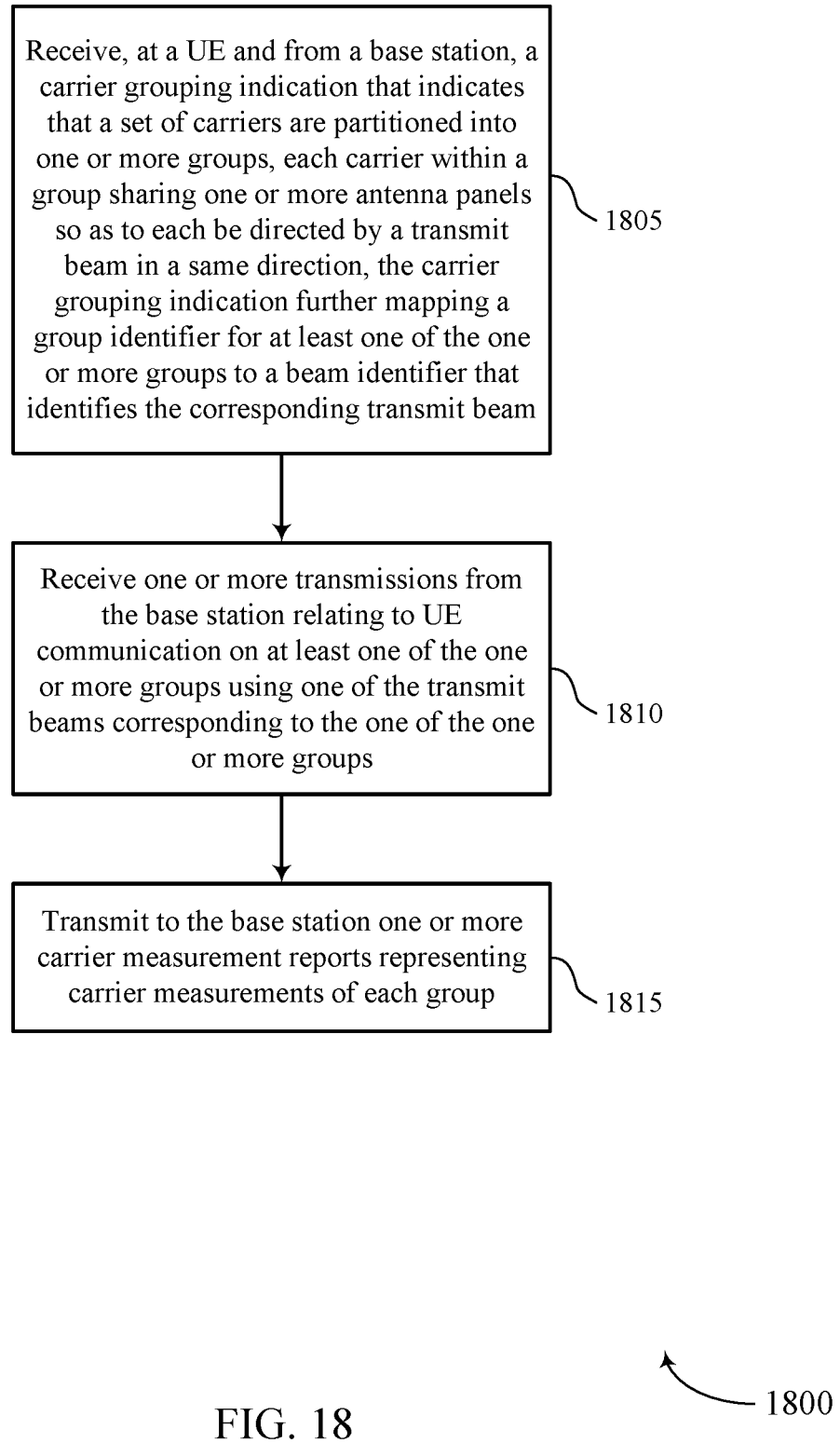

FIG. 18 shows a flowchart illustrating a method 1800 for beam reporting and scheduling in multicarrier beamformed communications, in accordance with one or more aspects of the present disclosure. The operations of method 1800 may be implemented by a UE 115 or its components as described herein. For example, the operations of method 1800 may be performed by a UE beamformed communication module as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive, from a base station, a carrier grouping indication that indicates that a set of carriers are partitioned into one or more groups, each carrier within a group sharing one or more antenna panels so as to each be directed by a transmit beam in a same direction, the carrier grouping indication further mapping a group identifier for at least one of the one or more groups to a beam identifier that identifies the corresponding transmit beam. The operations of block 1805 may be performed according to the methods described with reference to FIGS. 1 through 4. In some examples, aspects of the operations of block 1805 may be performed by a carrier group indication component as described with reference to FIGS. 9 through 12.

At block 1810 the UE 115 may receive one or more transmissions from the base station relating to UE communication on at least one of the one or more groups using one of the transmit beams corresponding to the one of the one or more groups. The operations of block 1810 may be performed according to the methods described with reference to FIGS. 1 through 4. In some examples, aspects of the operations of block 1810 may be performed by a carrier group communication component as described with reference to FIGS. 9 through 12.

At block 1815 the UE 115 may transmit to the base station one or more carrier measurement reports representing carrier measurements of each group. The operations of block 1815 may be performed according to the methods described with reference to FIGS. 1 through 4. In some examples, aspects of the operations of block 1815 may be performed by a measurement report component as described with reference to FIGS. 9 through 12.

It should be noted that the methods described above describe possible implementations, and that the operations and the methods may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are new releases of UMTS that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may for example, be used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, macro gNBs, small cell gNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Additionally or alternatively, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for multicarrier beamformed wireless communication with a network access device, the network access device configured to partition a plurality of carriers into a plurality of groups including a first group of carriers to be carried by a first transmit beam having a first beam direction and a different second group of carriers to be carried by a different second transmit beam having a different second beam direction, the method comprising:
by a user equipment (UE):
receiving an indication of the first group of carriers partitioned by the network access device to be carried by the first transmit beam having the first beam direction;
receiving an indication of the different second group of carriers partitioned by the network access device to be carried by the different second transmit beam having the different second beam direction; and
receiving, via the first transmit beam having the first beam direction and via the first group of carriers and based at least in part on the indication of the first group of carriers and the indication of the different second group of carriers, one or more transmissions comprising a scheduling grant to schedule the UE for communications on the different second transmit beam associated with the different second group of carriers.

2. The method of claim 1, wherein receiving the scheduling grant comprises:
receiving a downlink control information message including the scheduling grant.

3. The method of claim 1, wherein receiving the one or more transmissions comprises:
receiving, on a carrier of the plurality of carriers, a single scheduling grant to the UE to simultaneously schedule the UE on one or more carriers within one of the plurality of groups.

4. The method of claim 1, wherein receiving the one or more transmissions comprises:
receiving a request for one or more carrier measurement reports, wherein the request indicates whether the UE is to provide the one or more carrier measurement reports on a per carrier basis, the one or more carrier measurement reports on a per group basis, or combinations thereof.

5. The method of claim 4, wherein the request for the one or more carrier measurement reports further indicates that the one or more carrier measurement reports for carriers of at least one group are to be transmitted on a single respective carrier.

6. The method of claim 1, further comprising:
transmitting one or more carrier measurement reports representing carrier measurements of a same transmit beam corresponding to each group of the plurality of groups.

7. The method of claim 6, wherein the one or more carrier measurement reports include the one or more carrier measurement reports on a per carrier basis for carriers within each group.

8. The method of claim 6 wherein the one or more carrier measurement reports include the one or more carrier measurement reports on a per group basis for all carriers within each group.

9. The method of claim 6, further comprising:
transmitting the one or more carrier measurement reports for carriers of at least one group on a single respective carrier.

10. An apparatus for multicarrier beamformed wireless communication by a user equipment (UE) with a network access device, the network access device configured to partition a plurality of carriers into a plurality of groups including a first group of carriers to be carried by a first transmit beam having a first beam direction and a different second group of carriers to be carried by a different second transmit beam having a different second beam direction, comprising:
a processor;
memory; and
instructions stored in the memory and executable by the processor to cause the apparatus to:
receive an indication of the first group of carriers partitioned by the network access device to be carried by the first transmit beam having the first beam direction;
receive an indication of the different second group of carriers partitioned by the network access device to be carried by the different second transmit beam having the different second beam direction; and
receive, via the first transmit beam having the first beam direction and via the first group of carriers and based at least in part on the indication of the first group of carriers and the indication of the different second group of carriers, one or more transmissions comprising a scheduling grant to schedule the UE for communications on the different second transmit beam associated with the different second group of carriers.

11. The apparatus of claim 10, wherein the instructions to receive the scheduling grant are executable by the processor to cause the apparatus to:
receive a downlink control information message including the scheduling grant.

12. The apparatus of claim 10, wherein the instructions to receive the one or more transmissions are executable by the processor to cause the apparatus to:
receive, on a carrier of the plurality of carriers, a single scheduling grant to the UE to simultaneously schedule the UE on one or more carriers within one of the plurality of groups.

13. The apparatus of claim 10, wherein the instructions to receive the one or more transmissions are executable by the processor to cause the apparatus to:
receive a request for one or more carrier measurement reports, wherein the request indicates whether the UE is to provide the one or more carrier measurement reports on a per carrier basis, the one or more carrier measurement reports on a per group basis, or combinations thereof.

14. The apparatus of claim 13, wherein the request for the one or more carrier measurement reports further indicates that the one or more carrier measurement reports for carriers of at least one group are to be transmitted on a single respective carrier.

15. The apparatus of claim 10, wherein the instructions are further executable by the processor to cause the apparatus to:
transmit one or more carrier measurement reports representing carrier measurements of a same transmit beam corresponding to each group of the plurality of groups.

16. The apparatus of claim 15, wherein the one or more carrier measurement reports include the one or more carrier measurement reports on a per carrier basis for carriers within each group.

17. The apparatus of claim 15, wherein the one or more carrier measurement reports include the one or more carrier measurement reports on a per group basis for all carriers within each group.

18. The apparatus of claim 15, wherein the instructions are further executable by the processor to cause the apparatus to:
transmit the one or more carrier measurement reports for carriers of at least one group on a single respective carrier.

19. An apparatus for multicarrier beamformed wireless communication by a user equipment (UE) with a network access device, the network access device configured to partition a plurality of carriers into a plurality of groups including a first group of carriers to be carried by a first transmit beam having a first beam direction and a different second group of carriers to be carried by a different second transmit beam having a different second beam direction, the apparatus comprising:
means for receiving an indication of the first group of carriers partitioned by the network access device to be carried by the first transmit beam having the first beam direction;
means for receiving an indication of the different second group of carriers partitioned by the network access device to be carried by the different second transmit beam having the different second beam direction; and
means for receiving, via the first transmit beam having the first beam direction and via the first group of carriers and based at least in part on the indication of the first group of carriers and the indication of the different second group of carriers, one or more transmissions comprising a scheduling grant to schedule the UE for communications on the different second transmit beam associated with the different second group of carriers.

20. A non-transitory computer-readable medium storing code for multicarrier beamformed wireless communication by a user equipment (UE) with a network access device, the network access device configured to partition a plurality of carriers into a plurality of groups including a first group of carriers to be carried by a first transmit beam having a first beam direction and a different second group of carriers to be carried by a different second transmit beam having a different second beam direction, the code comprising instructions executable by a processor to:
- receive an indication of the first group of carriers partitioned by the network access device to be carried by the first transmit beam having the first beam direction;
- receive an indication of the different second group of carriers partitioned by the network access device to be carried by the different second transmit beam having the different second beam direction; and
- receive, via the first transmit beam having the first beam direction and via the first group of carriers and based at least in part on the indication of the first group of carriers and the indication of the different second group of carriers, one or more transmissions comprising a scheduling grant to schedule the UE for communications on the different second transmit beam associated with the different second group of carriers.

* * * * *